(12) United States Patent
Takaragi et al.

(10) Patent No.: US 7,586,641 B2
(45) Date of Patent: Sep. 8, 2009

(54) SYSTEM FOR CERTIFYING WHETHER PRINTED MATERIAL CORRESPONDS TO ORIGINAL

(75) Inventors: Yoichi Takaragi, Yokohama (JP);
Kenichi Takahashi, Shinagawa (JP);
Tatsuo Shinagawa, Yokohama (JP);
Akihiro Matsuya, Yokohama (JP);
Kunio Yoshihara, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 10/544,111

(22) PCT Filed: Feb. 10, 2004

(86) PCT No.: PCT/JP2004/001425

§ 371 (c)(1),
(2), (4) Date: Aug. 2, 2005

(87) PCT Pub. No.: WO2004/072845

PCT Pub. Date: Aug. 26, 2004

(65) Prior Publication Data

US 2006/0203255 A1   Sep. 14, 2006

(30) Foreign Application Priority Data

Feb. 14, 2003 (JP) ............................ 2003-036488
Mar. 13, 2003 (JP) ............................ 2003-067529
Mar. 28, 2003 (JP) ............................ 2003-090002

(51) Int. Cl.
*G06F 15/00* (2006.01)
*G06K 1/00* (2006.01)
*H04N 1/60* (2006.01)
*G06K 9/00* (2006.01)
*H04L 9/32* (2006.01)

(52) U.S. Cl. .................. 358/1.9; 358/1.15; 358/1.16; 358/3.28; 382/100; 713/164

(58) Field of Classification Search ............... 358/1.1, 358/1.15, 1.16, 1.9, 3.28; 713/176, 164
See application file for complete search history.

(56) References Cited

U.S. PATENT DOCUMENTS 5,227,871 A   7/1993   Funada et al. ............... 358/75

(Continued)

FOREIGN PATENT DOCUMENTS

EP   1 197 828 A1   4/2002

(Continued)

*Primary Examiner*—Mark K Zimmerman
*Assistant Examiner*—Ming Hon
(74) *Attorney, Agent, or Firm*—Fitzpatrick, Cella, Harper & Scinto

(57) ABSTRACT

A data processing method, which is provided in an image processing system in which a server and a data processor communicate with each other to perform a predetermined data process, includes a step of extracting a feature amount of electronic data to be output from a printer, a step of transmitting original specifying information including the extracted feature amount and a user ID for discriminating a print requester of the electronic data, to the server, a step of controlling generation of print data to be output to the printer, based on original certification information notified by the server, and a step of causing the printer to print the generated print data and information indicating that the print data corresponds to an original. By this method, a large storage capacity is not required to certify one data, and to keep a secret of the stored electronic data is easy.

5 Claims, 28 Drawing Sheets

U.S. PATENT DOCUMENTS

| | | | |
|---|---|---|---|
| 5,363,202 A | 11/1994 | Udagawa et al. | 358/501 |
| 5,363,454 A | 11/1994 | Udagawa et al. | 382/17 |
| 5,430,525 A | 7/1995 | Ohta et al. | 355/201 |
| 5,481,377 A | 1/1996 | Udagawa et al. | 358/501 |
| 5,633,952 A | 5/1997 | Outa et al. | 382/165 |
| 5,731,880 A | 3/1998 | Takaragi et al. | 358/296 |
| 5,745,686 A | 4/1998 | Saito et al. | |
| 5,847,849 A | 12/1998 | Funada et al. | 358/530 |
| 5,917,938 A | 6/1999 | Funada et al. | 382/165 |
| 5,930,369 A | 7/1999 | Cox et al. | 380/54 |
| 5,933,520 A | 8/1999 | Ishimoto et al. | 382/135 |
| 5,949,903 A | 9/1999 | Outa et al. | 382/165 |
| 6,205,287 B1 | 3/2001 | Takahashi et al. | 386/111 |
| 6,208,735 B1 | 3/2001 | Cox et al. | 380/54 |
| 6,327,656 B2 * | 12/2001 | Zabetian | 713/176 |
| 6,346,989 B1 | 2/2002 | Funada et al. | 358/1.14 |
| 6,381,030 B1 | 4/2002 | Udagawa et al. | 358/1.14 |
| 6,388,767 B1 | 5/2002 | Udagawa et al. | 358/1.9 |
| 6,400,470 B1 | 6/2002 | Takaragi et al. | 358/448 |
| 6,411,784 B1 | 6/2002 | Taniguchi | |
| 6,421,145 B1 | 7/2002 | Kurita et al. | 358/448 |
| 6,621,922 B2 | 9/2003 | Takaragi et al. | 382/162 |
| 6,944,314 B2 | 9/2005 | Shimada | |
| 6,965,682 B1 * | 11/2005 | Davis et al. | 382/100 |
| 7,058,608 B1 | 6/2006 | Nagata et al. | |
| 2001/0007130 A1 | 7/2001 | Takaragi | 713/186 |
| 2001/0054145 A1 | 12/2001 | Shimada | |
| 2002/0021808 A1 | 2/2002 | Iwamura | |
| 2002/0042884 A1* | 4/2002 | Wu et al. | 713/201 |
| 2002/0054356 A1 | 5/2002 | Kurita et al. | 358/3.28 |
| 2002/0095577 A1 | 7/2002 | Nakamura et al. | |
| 2002/0163671 A1 | 11/2002 | Takaragi | 358/3.28 |
| 2002/0169721 A1* | 11/2002 | Cooley et al. | 705/51 |
| 2003/0035151 A1 | 2/2003 | Kurita et al. | 358/448 |
| 2007/0098214 A1 | 5/2007 | Iwamura | |

FOREIGN PATENT DOCUMENTS

| | | |
|---|---|---|
| JP | 9-54735 | 2/1997 |
| JP | 9-191394 | 7/1997 |
| JP | 11-327438 | 11/1999 |
| JP | 2000-215238 | 8/2000 |
| JP | 2000-224407 | 8/2000 |
| JP | 2000-285024 | 10/2000 |
| JP | 2000-399223 | 12/2000 |
| JP | 2001-5728 | 1/2001 |
| JP | 2001-034666 | 2/2001 |
| JP | 2001-147898 | 5/2001 |
| JP | 2001-154577 | 6/2001 |
| JP | 2001-156967 | 6/2001 |
| JP | 2001-167086 | 6/2001 |
| JP | 2001-202436 | 7/2001 |
| JP | 2001-209581 | 8/2001 |
| JP | 2001-209582 | 8/2001 |
| JP | 2001-358935 | 12/2001 |
| JP | 2002-57883 | 2/2002 |
| JP | 2002-91465 | 3/2002 |
| JP | 2002-169681 | 6/2002 |
| JP | 2002-374401 | 12/2002 |
| WO | 02/32047 A1 | 4/2002 |

* cited by examiner

FIG. 2

```
┌─────────────────────────────────┐
│  ┌──────────201──────────────┐  │
│  │ REGISTERED PRINT          │  │
│  │ REGISTRATION NUMBER: XXXXXX   DATE: MAY 6, 2002 │
│  │  ┌─────────────────────┐  │  │
│  │  │                     │  │  │
│  │  │                     │  │  │
│  │  │   TEXT PRINT AREA   │  │  │
│  │  │                     │  │  │
│  │  │                     │  │  │
│  │  └─────────────────────┘  │  │
│  │                    202    │  │
│  └───────────────────────────┘  │
└─────────────────────────────────┘
```

FIG. 11

CERTIFICATE OF REGISTRATION CONFIRMATION

OK YYYYYY OK YYYYYY OK YYYYYY
OK YYYYYY OK YYYYYY OK YYYYYY

REGISTRATION NUMBER: XXXXXX    DATE: MAY 6, 2002

CERTIFIED AS NEWEST ORIGINAL REGISTERED

CERTIFICATION NUMBER: YYYYYY
CERTIFIED DATE: MAY 9, 2002

OK YYYYYY OK YYYYYY OK YYYYYY
OK YYYYYY OK YYYYYY OK YYYYYY

FIG. 12

CERTIFICATE OF REGISTRATION CONFIRMATION (OLD VERSION)

OK YYYYYY OK YYYYYY OK YYYYYY
OK YYYYYY OK YYYYYY OK YYYYYY

REGISTRATION NUMBER: XXXXXX    DATE: MAY 6, 2002

CERTIFIED AS ORIGINAL REGISTERED, EVEN NOT IN NEWEST VERSION

CERTIFICATION NUMBER: YYYYYY
CERTIFIED DATE: MAY 9, 2002

OK YYYYYY OK YYYYYY OK YYYYYY
OK YYYYYY OK YYYYYY OK YYYYYY

FIG. 13

UNCERTIFIED AS REGISTRATION

REGISTRATION NUMBER: XXXXXX    DATE: MAY 6, 2002

UNCERTIFIED AS ORIGINAL REGISTERED

CERTIFICATION NUMBER: YYYYYY
CERTIFIED DATE: MAY 9, 2002

FIG. 17

CERTIFICATE OF REGISTRATION CONFIRMATION

REGISTRATION NUMBER: XXXXXX    DATE: MAY 6, 2002

CERTIFIED AS NEWEST ORIGINAL REGISTERED

CERTIFICATION NUMBER: YYYYYY
CERTIFIED DATE: MAY 9, 2002

FIG. 18

CERTIFICATION OF REGISTRATION CONFIRMATION 1001

OK YYYYYY OK YYYYYY OK YYYYYY
OK YYYYYY OK YYYYYY OK YYYYYY

REGISTRATION NUMBER: XXXXXX   DATE: MAY 6, 2002

CERTIFIED AS ORIGINAL REGISTERED

CERTIFICATION NUMBER: YYYYYY
CERTIFIED DATE: MAY 9, 2002

OK YYYYYY OK YYYYYY OK YYYYYY
OK YYYYYY OK YYYYYY OK YYYYYY

SYSTEM FOR CERTIFYING WHETHER PRINTED MATERIAL CORRESPONDS TO ORIGINAL

TECHNICAL FIELD

The present invention relates to an image processing system in which print data can be printed by using a server apparatus for certifying whether or not a printed material corresponds to an original.

BACKGROUND ART

Conventionally, various kinds of print systems which perform a print process to a document to which authenticity should be certified are proposed as follows.

For example, in Japanese Patent Application Laid-Open No. 2000-285024, to cause electronic information to have a property of a paper original and thus increase probative force of the electronic information, in a case where electronic data is stored, a file attribute code indicating that the electronic data in question corresponds to the original is added, and the electronic data to which the file attribute code has been added is stored in a state distinguishable from at least other electronic data.

Further, in Japanese Patent Application Laid-Open No. 2001-202436, to ensure security of a stored written application document for a long period of time, an electronic application system in which an application of an electronic document is performed from a terminal through a network. Here, the electronic application system consists of a document storage apparatus, a calculation means for calculating alteration detection code from information including the document transmitted from the terminal, and a storage means for storing the information and the alteration detection code in the document storage apparatus.

Furthermore, in Japanese Patent Application Laid-Open No. 2000-224407 filed by the applicant of the present application, to improve reliability of printing concerning a digital signature, a message digest value is added to a print in a form by which alteration is difficult, whereby the value of document data to which the digital signature has been appended can be improved.

Moreover, as shown in Japanese Patent Application Laid-Open Nos. 2000-285024 and 2001-202436, when the former data is stored in an administration server as of electronic information, a large-scale electronic storage apparatus is necessary, whereby it is not easy to maintain and administrate the storage apparatus. Besides, because the electronic information is stored in the external storage apparatus for a long period of time, a risk that secret information is leaked increases.

Furthermore, although Japanese Patent Application Laid-Open No. 2000-224407 filed by the applicant proposes the method to increase the reliability of printing concerning the digital signature, it is not disclosed even in this case that a third party certifies the date and hour when the printing is performed and the contents of the print obtained in the printing.

Incidentally, in such conventional print systems as described above, it is necessary to store a great deal of information so that a printed material is obtained as it is certified that the obtained printed material corresponds to the original. For this reason, a large storage capacity is required in the storage apparatus to certify one data, whereby a serious and significant administration load is imposed to the system for keeping a secret of the stored electronic data.

DISCLOSURE OF THE INVENTION

An object of the present invention is to provide an image processing system which solved the above conventional problem.

Another object of the present invention is to provide an image processing system in which it is possible to certify that a printed material corresponds to an original, without using a large storage capacity on a server apparatus side.

The above and other objects and features of the present invention will be apparent from the following description in conjunction with the accompanying drawings.

BRIEF DESCRIPTION OF THE DRAWINGS

FIG. 2 is a diagram for explaining the content of a print which is output from a printer shown in FIG. 1 and to which an original certification code has been added;

FIG. 11 is a diagram showing an example of the printed result of an updated registration confirmation certification in the image processing system according to the present invention;

FIG. 12 is a diagram showing an example of the printed result of the updated registration confirmation certification in the image processing system according to the present invention;

FIG. 13 is a diagram showing an example of the printed result of a registration non-confirmation certification in the image processing system according to the present invention;

FIG. 17 is a diagram showing an example of the printed result of a registration confirmation certification in the image processing system according to the present invention;

FIG. 18 is a diagram showing an example of the printed result of the registration confirmation certification in the image processing system according to the present invention;

BEST MODE FOR CARRYING OUT THE INVENTION

First Embodiment

Figure 1:
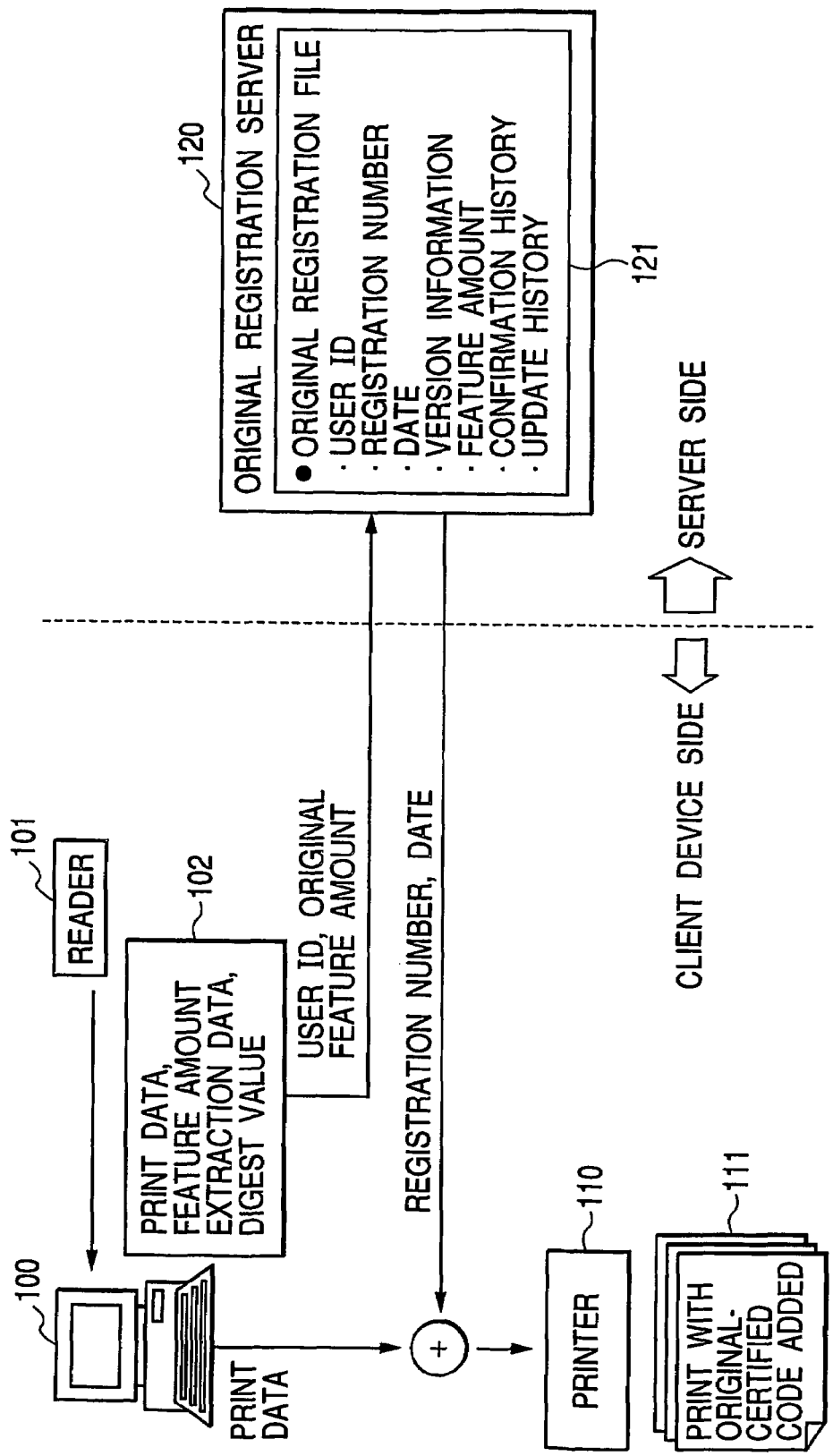
FIG. 1 is a block diagram showing the structure of an image processing system according to the first embodiment of the present invention.

FIG. 1 is a block diagram showing the structure of an image processing system according to the first embodiment of the present invention and corresponds to an example of an image processing system, in which client devices and a server which are provided across a broken line shown in FIG. 1 can communicate with each other. In the present embodiment, the server is structured by an original registration server which manages a file treated as an original registered every user.

In FIG. 1, a user personal computer (PC) 100 extracts feature amount from a user ID and print data and sends the extracted feature amount to an original registration server 120. A reader 101 reads original data when the original registration is confirmed.

When the original is registered, the original registration server 120 receives the user ID and original feature amount from the user PC 100 and stores them as an original registration file 121.

Moreover, when the original is reprinted, the original registration server 120 receives the user ID, the original feature amount and a registration number from the user PC 100 and stores a fact of reprinting the original registration file 121 as a history.

Registration data to be stored in a storage area of the original registration server 120 is stored in the original registration file 121. A printer 110 synthesizes print data sent from the user PC 100 with a print number and date information obtained from the original registration server 120 and outputs a print 111 to which an original certification code has been added (hereinafter, called a print 111 with original-certified code added) with a format as shown in FIG. 2.

Numeral 102 denotes storage data which is composed of print data, feature amount extraction data and a message digest value (digest value).

FIG. 2 is a diagram for explaining the contents of the print 111 with original-certified code added which is output from the printer 110 shown in FIG. 1.

In FIG. 2, numeral 201 denotes a certification contents area, which is characterized by such an example where a text output area for the print number and the date information obtained from the original registration server 120 is secured in, e.g., a header area of a sheet. Numeral 202 denotes a text print area where print data obtained after executing an image process in the user PC 100 for image data which is input from the reader 101 shown in FIG. 1 is displayed.

Figure 3:
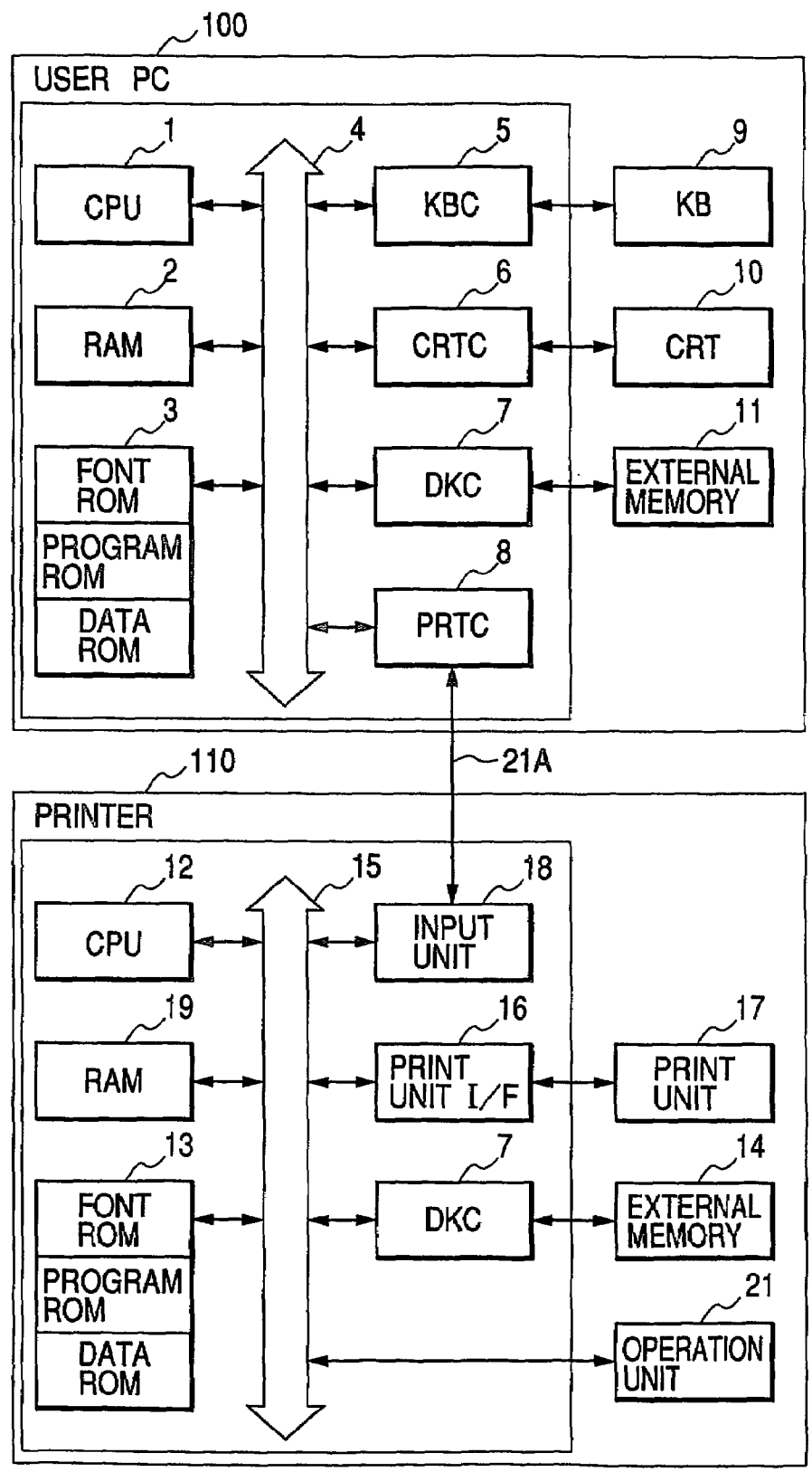
FIG. 3 is a block diagram for explaining the structure of the image processing system to which an information processing apparatus according to the first embodiment of the present invention is applicable.

FIG. 3 is a block diagram for explaining the structure of the image processing system to which an information processing apparatus according to the first embodiment of the present invention is applicable. In FIG. 3, the same structural components as those in FIG. 1 are denoted by the same numerals, and those components correspond to the structure of a client device side shown in FIG. 1. It is assumed that the original registration server 102 also has the same structure as that of the user PC shown in FIG. 3.

It should be noted that the present invention is applicable to even single equipment, a system composed of plural equipments or a system of executing processes through a network such as a LAN, a telephone line or the like, if the function of the present invention can be executed.

In FIG. 3, the user PC 100 includes a CPU 1 which executes word processing, wherein data such as figures (graphics), images, characters, tables (includes calculation in tables) and the like appear with a mixed state, on the basis of a word processing program or the like stored in a program ROM in a ROM 3, an external memory 11 or the like, and the CPU 1 synthetically controls each of devices connected to a system bus 4.

Further, a control program and the like of the CPU 1 are stored in the program ROM in the ROM 3, font data and the like used for executing the above word processing are stored in a font ROM in the ROM 3 and various data used for executing the above word processing are stored in a data ROM in the ROM 3.

Numeral 2 denotes a RAM, which functions as a main memory and a work area of the CPU 1. Numeral 5 denotes a keyboard controller (KBC), which controls key-inputs from a keyboard (KB) 9 or a pointing device (not shown). Numeral 6 denotes a CRT controller (CRTC), which controls the display in a CRT display (CRT) 10.

Numeral 7 denotes a disk controller (DKC), which controls access to the external memory 11 such as a hard disk (HD), a flexible disk (FD) or the like for storing a boot program, various application software, font data, a user file, an editing file and the like.

Numeral 8 denotes a printer controller (PRTC), which is connected to the printer 110 through a predetermined interactive interface (interface) 21A and executes a communication control process, which is executed with the printer 110.

It should be noted that the CPU 1 executes, e.g., a development (rasterizing) process of an outline font to a display information RAM set on the RAM 2, and a process of WYSIWYG (What You See Is What You Get) on the CRT 10 can be realized.

Further, the CPU 1 opens registered various windows on the basis of commands instructed by a mouse cursor (not shown) or the like on the CRT 10 and executes various data processes.

In the printer 110, a printer CPU (CPU) 12 synthetically controls access to various devices connected to a system bus 15 on the basis of a control program or the like stored in a program ROM in a ROM 13 or a control program stored in an external memory 14 and outputs an image signal as output information to a print unit (printer engine) 17 connected through a print unit interface 16.

Moreover, a control program of the CPU 12 is stored the program ROM in the ROM 13.

Furthermore, font data or the like used for generating the above output information is stored in a font ROM in the ROM 13 and information or the like utilized on the user PC is stored in a data ROM in the ROM 13 in case of lacking the external memory 14 such as a hard disk or the like.

The CPU 12 can communicate with the user PC 100 through an input unit 18, and it is structured that information or the like in the printer 110 can be notified to the user PC 100.

Numeral 19 denotes a RAM, which functions as a main memory and a work area of the CPU 12, and it is structured that memory capacity can be expanded by an optional RAM to be connected to an increase port (not shown). The RAM 19 is used as an output information development area, an environment data storage area, an NVRAM (Non-Volatile Random Access Memory) or the like.

Access to the external memory 14 such as the above hard disk (HD), an IC card or the like is controlled by a disk controller (DKC) 20.

The external memory 14 is connected as an optional memory and stores font data, an emulation program, form data and the like.

The external memory is not limited to one, but may be structured that at least one or more memories are provided and plural external memories 14 storing an optional font card, a program of interpreting a printer control language of a different language system in addition to the built-in font data can be connected. Further, it may be structured that an NVRAM (not shown) is provided for storing printer mode setting information sent from an operation panel (operation unit) 21.

Figure 4:
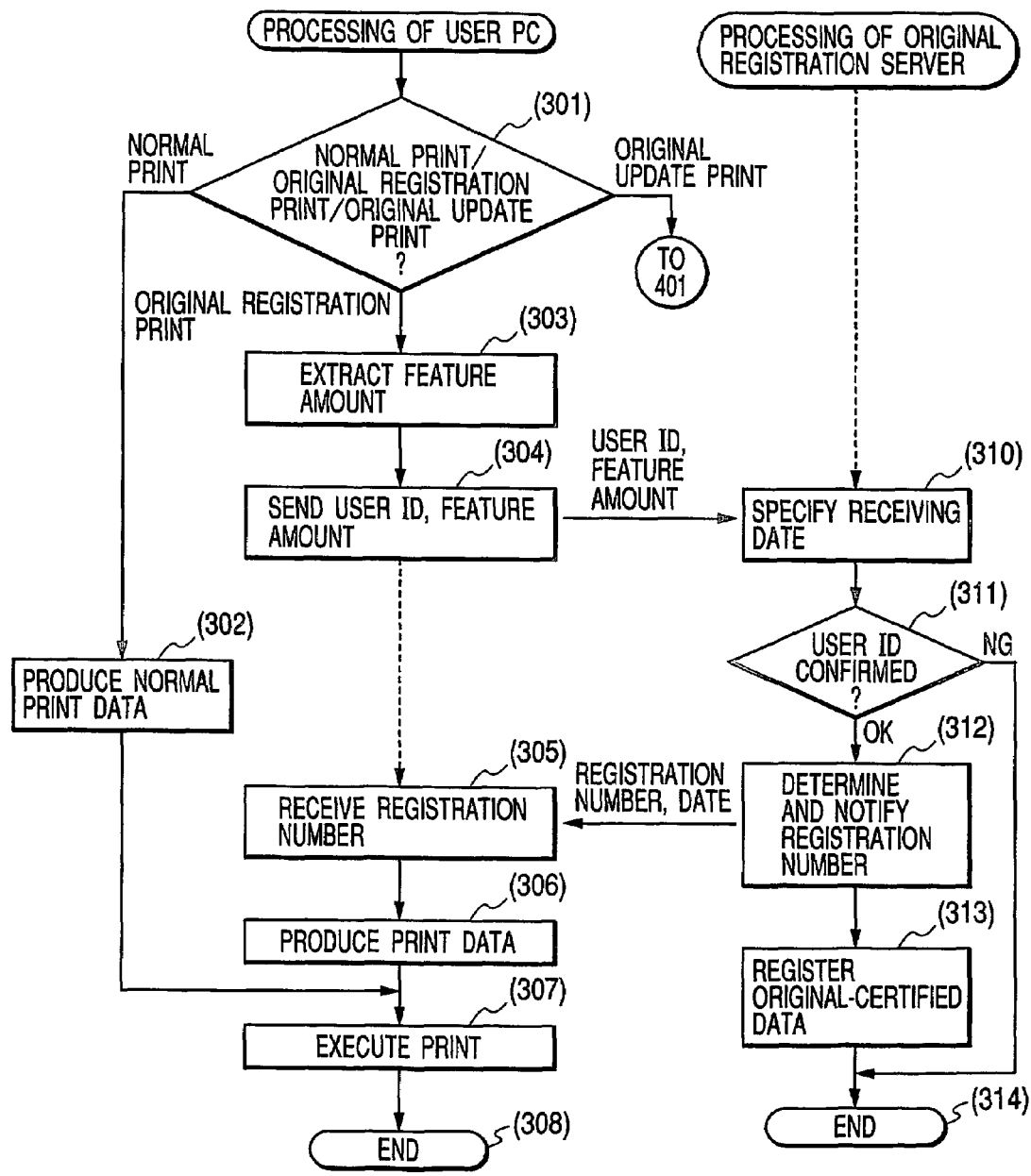
FIG. 4 is a flow chart showing an example of a first data processing procedure in the image processing system according to the present invention.

FIG. 4 is a flow chart showing an example of a first data processing procedure in the image processing system according to the present invention. Here, it should be noted that the first data processing procedure corresponds to the processing procedure in a series of image processing between the user PC 100 and the original registration server 120 shown in FIG. 1, steps (301) to (308) are the steps to be executed on the side of the user PC 100, and steps (310) to (314) are the steps to be executed on the side of the original registration server 120. Incidentally, it is assumed that a control program for controlling these steps is loaded from the external memory 11 or the like onto the RANT 2 and then executed by the CPU 1. Hereinafter, a print process will be explained in detail.

Figure 5:
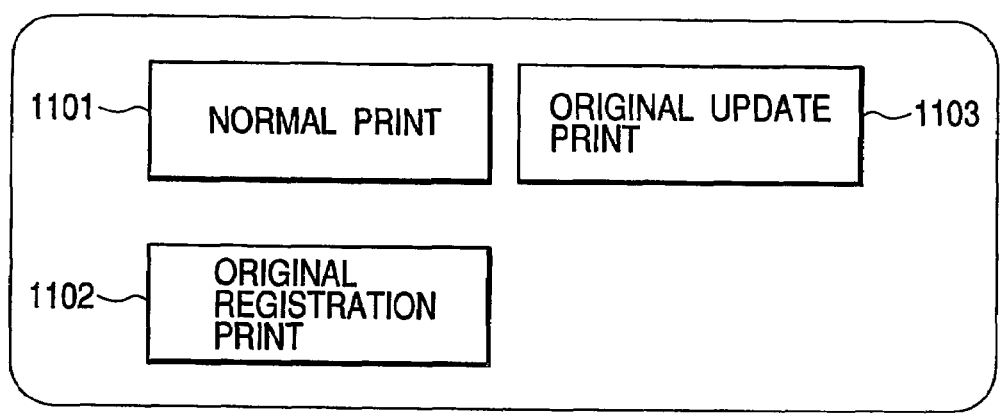
FIG. 5 is a diagram showing a first print attribute selection screen displayed on a CRT shown in FIG. 3.

FIG. 5 is a diagram showing an example of a first print attribute selection screen displayed on a CRT 10 shown in FIG. 3, and that screen is assumed to be displayed as a user interface by, e.g., printer driver software loaded from the external memory 11 onto the RAM 2.

In FIG. 5, numeral 1101 denotes a normal print button, and when the button 1101 is depressed to issue an instruction, the printer 110 produces print data which can be output, from output information which is output from application software of the user PC 100 shown in FIG. 1 and then the produced data is output by the printer 110.

Numeral 1102 denotes an original registration print button, and when the button 1102 is depressed to issue an instruction, the printer 110 produces the print data which can be output, from the output information which is output from the application software of the user PC 100 shown in FIG. 1, and print data produced from a reprint number and date data which are obtained from the original registration server 120 is synthesized with the above produced data and then the synthesized data is output by the printer 110.

Numeral 1103 denotes an original update print button, and when the button 1103 is depressed to issue an instruction, the print 111 with original-certified code added which becomes a former original is read by the reader 101 shown in FIG. 1. Then, data of the registration number and date and a digest value are extracted by a predetermined image process (includes character recognition process) and a hash conversion is performed based from print data which becomes a new original and then a message digest value is extracted as the feature amount. Thereafter, the user ID already set in the user PC 100, the extracted data of the registration number and date and the digest value of the former original and a digest value of the new original to be extracted are sent to the original registration server 120.

Initially, in the step (301) shown in FIG. 4, an operation screen shown in FIG. 5 is displayed on the CRT 10 of the user PC 100, and a user selects any print among a normal print, an original registration print and an original update print by any button among the normal print button 1101, the original registration print button 1102 and the original update print button 1103. When the user selects the original registration print, processes in the steps (303) to (306) are executed. When the user selects the normal print, a flow advances to the step (302), where only print data corresponding to a part of the text print area 202 shown in FIG. 2 is produced and then a flow advances to the step (307). When the original update print is selected, a flow shifts to a process shown in FIG. 9 to be described later.

Figure 6:
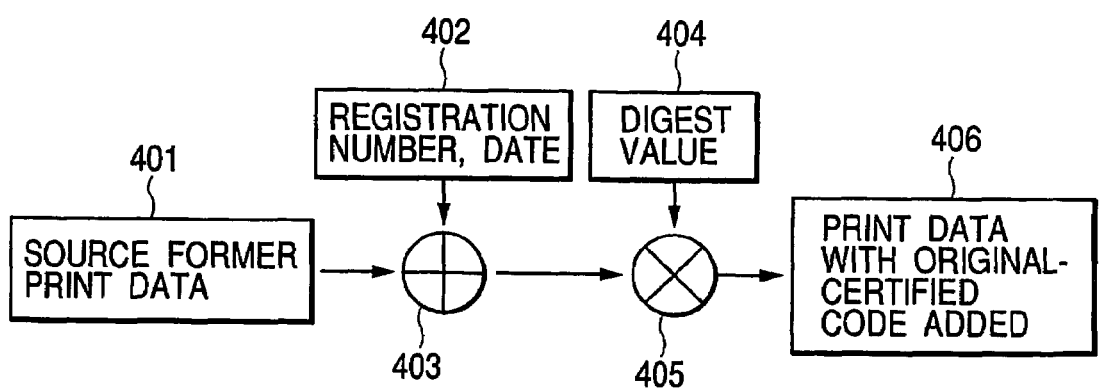
FIG. 6 is a diagram for explaining the state of a print data generation process by a user personal computer shown in FIG. 1.

On the other hand, in the step (301), when the original registration print is selected, the hash conversion is performed based from the print data by a method shown in FIG. 6 in the step (303) and then the message digest value is extracted as the feature amount.

Then, in the step (304), the user ID already set in the user PC and the digest value extracted in the step (303) are sent to the original registration server 120.

Next, in the step (305), the registration number issued by the original registration server 120 is received. Then, in the step (306), print data of the certification contents area 201 and the text print area 202 shown in FIG. 2 are produced. Then, in the step (307), a print process is executed by the printer 110 on the basis of the print data produced in the step (306) and then the process ends in a step (308).

The steps (310) to (314) are the steps of explaining processes to be executed in the original registration server 120.

Initially, in the step (310), the date of receiving data from the user PC 100 is specified. Then, in the step (311), it is inspected whether or not the user ID sent from the user PC 100 is correct, and when it is judged that the user ID is not correct, a flow advances to the step (314), and the process ends.

On the other hand, when it is judged that the user ID is correct in the step (311), the processes in the steps (312) and (313) are executed.

Then, in the step (312), a registration number uniquely determined by the receiving date and the user ID is fixed and data of the fixed number is sent to the user PC 100. Next, in the step (313), data corresponding to the original registration file 121 shown in FIG. 1 is stored, and then the process ends in the step (314).

In the present embodiment, the registration number, date and the like are to be notified in the step (312) after confirming the user ID, however, in case of not performing registration because of not confirming the user ID, this fact may be notified.

FIG. 6 is a diagram for explaining the state of a print data generation process by the user PC 100 shown in FIG. 1, and this print data generation process corresponds to the print data generation process executed in the step (306) in FIG. 4.

In FIG. 6, numeral 401 denotes source (former) print data and numeral 402 denotes transmission data including data of the registration number and date, which are transmitted from the original registration server 120. Numeral 403 denotes an additional process, by which data of the registration number and date to be printed on the certification contents area 201 shown in FIG. 2 is added to the print data of the text print area 202.

Numeral 405 denotes a digital watermark superimposing process, by which a message digest value (digest value) 404 is superimposed on the print data as a digital watermark by a method shown in FIG. 8 to be described later. Numeral 406 denotes print data with original-certified code added.

Figure 7:
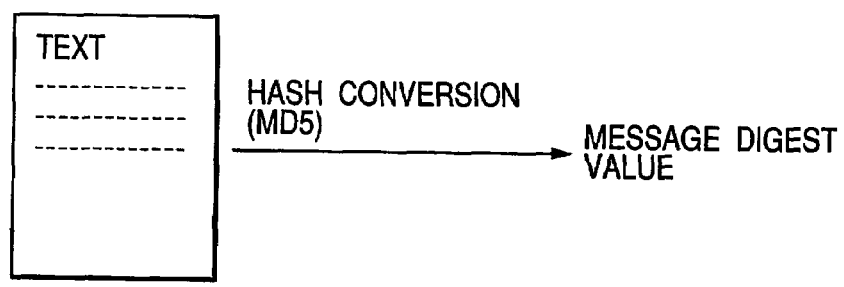
FIG. 7 is a diagram for explaining the concept of generating a message digest value by the user personal computer shown in FIG. 1.

FIG. 7 is a diagram for explaining the concept of generating the message digest value by the user PC 100 shown in FIG. 1, and this generating process corresponds to a feature amount extraction process in the step (303) shown in FIG. 4.

As shown in FIG. 7, in the present embodiment, the message digest value 404 is to be calculated by using, e.g., a Hash function MD5. The Hash function MD5 is, e.g., a PGP (Pretty Good Privacy) which is one of practically used coding programs and is used as a message digest function.

Figure 8:
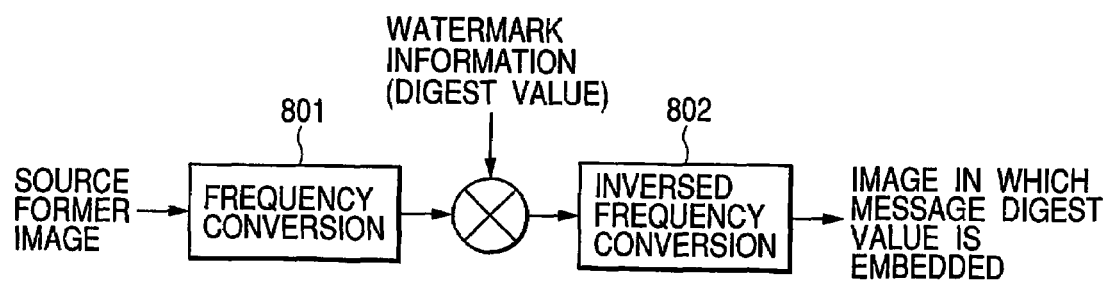
FIG. 8 is a diagram for explaining an example of a digital (or electronic) watermark process by the user personal computer shown in FIG. 1.

FIG. 8 is a diagram for explaining an example of a digital watermark process by the user PC 100 shown in FIG. 1.

As shown in FIG. 8, in the present embodiment, the message digest value 404 is added to a print image as digital watermark information. Numeral 801 denotes a frequency conversion process, by which a predetermined frequency conversion process is executed to source (former) image data. Numeral 802 denotes an inverse frequency conversion process. It should be noted that the digital watermark technology already has been known, and this technology is described in detail in, e.g., Japanese Patent Application Laid-Open No. H9-191394.

Figure 9:
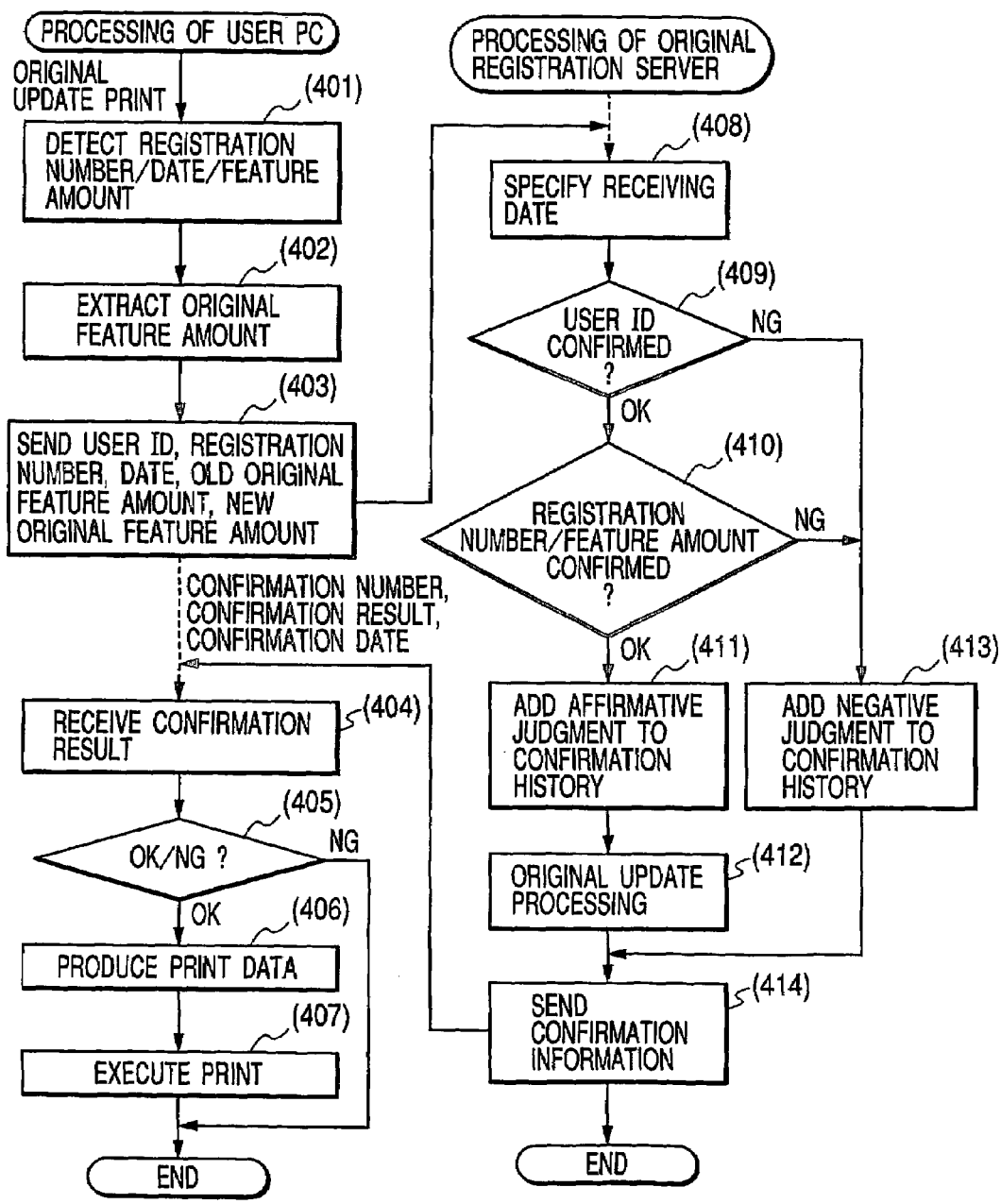
FIG. 9 is a flow chart showing an example of a second data processing procedure in the image processing system according to the present invention.

FIG. 9 is a flow chart showing an example of a second data processing procedure in the image processing system according to the present invention. Here, it should be noted that the second data processing procedure corresponds to the processing procedure in a series of original update print processing between the user PC 100 and the original registration server 120 shown in FIG. 1, steps (401) to (407) are the steps to be executed on the side of the user PC 100, and steps (408) to (414) are the steps to be executed on the side of the original registration server 120. Incidentally, it is assumed that a control program for controlling these steps is loaded from the external memory 11 or the like onto the RAM 2 and then executed by the CPU 1. Hereinafter, a print process will be explained in detail.

Initially, in the step (401), the print 111 with original-certified code added which becomes a former original is read by the reader 101 and data of the registration number and date and the digest value are extracted. Then, in the step (402), the hash conversion is performed based from print data which becomes a new original by a method shown in FIG. 7 and a message digest value is extracted as the feature amount.

Next, in the step (403), the user ID already set in the user PC 100, data of the registration number and date and the digest value of the former original extracted in the step (401) and a digest value of the new original extracted in the step (402) are sent to the original registration server 120.

Subsequently, in the step (404), a confirmation result in the original registration server 120 is received. Then, in the step (405), it is judged if the confirmation result is OK or NG. If it is an affirmative (OK) judgment, print data of the certification contents area 201 and the text print area 202 shown in FIG. 2 are produced in the step (406) and the produced print data is printed by the printer 110 in the step (407), then the process ends.

On the other hand, in the step (405), when it is judged that the confirmation result is NG, the process ends.

Hereinafter, processes executed in the original registration server 120 will be explained in the steps (408) to (414).

Initially, in the step (408), the date of receiving data from the user PC 100 is specified. Then, in the step (409), it is inspected whether or not the user ID sent from the user PC 100 is correct, and when it is judged that the user ID is correct, data of the registration number and date and the digest value sent from the user PC 100 are received in the step (410), and the received information is checked with the contents of the original registration file 121 to judge whether or not they are coincident with each other. When it is judged that they are coincident with each other, an affirmative judgment and a confirmation date are stored in an item of confirmation history of the original registration file 121 in the step (411).

Next, in the step (412), an original update process, wherein the date in the original registration file 121 is updated to a value specified in the step (408), the feature amount is updated by the digest value of the new original extracted in the step (402), version information is updated, and the date, the feature amount and the version information concerning the former original are stored in an item of update history, is executed. Then, when the confirmed judgment result is notified to the user PC 100 in the step (414), the process ends.

On the other hand, when the user ID can not be confirmed in the step (409) and when the confirmation of the registration number and the feature amount is judged as NG in the step (410), a flow advances to the step (413), where a negative judgment and a confirmation date are stored in an item of the confirmation history of the original registration file 121, then a flow advances to the step (414).

Figure 10:
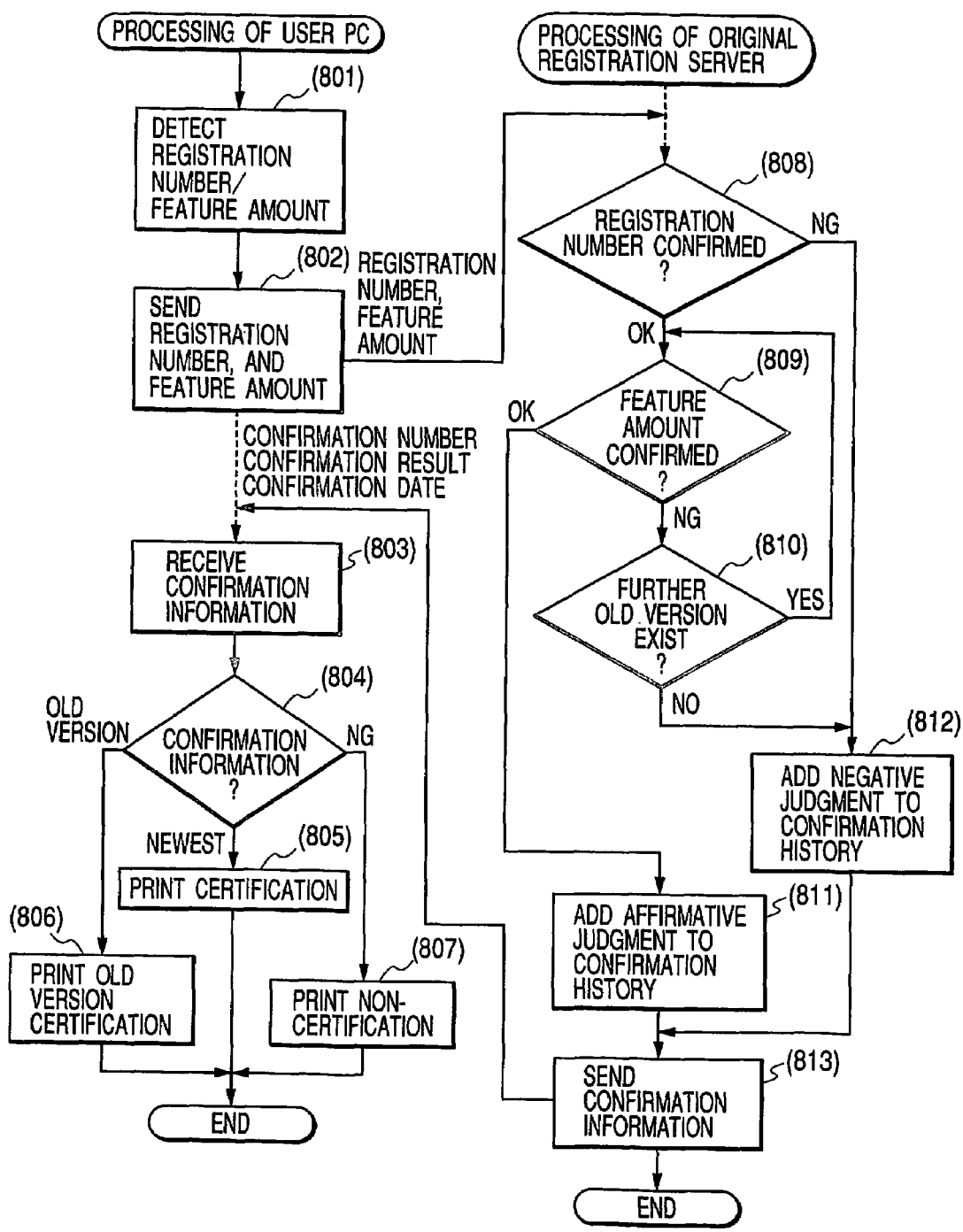
FIG. 10 is a flow chart showing an example of a third data processing procedure in the image processing system according to the present invention.

FIG. 10 is a flow chart showing an example of a third data processing procedure in the image processing system according to the present invention. Here, it should be noted that the third data processing procedure corresponds to the processing procedure in a series of original registration confirmation processing of the prints between the user PC 100 and the original registration server 120 shown in FIG. 1, steps (801) to (807) are the steps to be executed on the side of the user PC 100, and steps (808) to (813) are the steps to be executed on the side of the original registration server 120. Incidentally, it is assumed that a control program for controlling these steps is loaded from the external memory 11 or the like onto the RAM 2 and then executed by the CPU 1. Hereinafter, a print process will be explained in detail.

Initially, in the step (801), the print 111 with original-certified code added is read by the reader 101 and data of the registration number and date and the digest value 504 are extracted. Then, in the step (802), the data extracted in the step (801) is sent to the original registration server 120. Next, in the step (803), the confirmation result in the original registration server 120 is received.

Then, in the step (804), a new or former state of the confirmation result is judged from the version in confirmation information received in the step (803), and when the confirmation result is the most new version, a registration confirmation certification with a format shown in FIG. 11 is printed in the step (805), when the confirmation result is a former version, a registration confirmation certification with a format shown in FIG. 12 is printed in the step (806), and when it is a negative judgment, a registration unconfirmed certification (non-confirmation) with a format shown in FIG. 13 is printed in the step (807), then the process ends.

Hereinafter, processes executed in the original registration server 120 indicated in the steps (808) to (813) will be explained.

Initially, in the step (808), data of the registration number and date sent from the user PC 100 is received, and the received information is checked with the contents of the original registration file 121 to judge whether or not they are coincident with each other. When it is judged that they are coincident with each other, the digest value sent from the user PC 100 is received in the step (809) and then the received data is checked with the contents of the original registration file 121 to judge whether or not they are coincident with each other. When it is judged that they are coincident with each other, a flow advances to the step (811), and when it is judged that they are not coincident with each other, a flow advances to the step (810).

Then, in the step (810), it is confirmed whether or not a former version exists in an item of the update history of the original registration file 121, and when it is judged that the former version exists, the feature amount which becomes a comparative target with the digest value sent from the user PC 100 is replaced by a former version value, then a process in the step (809) is executed. When it is judged that the former version does not exist, a flow advances to the step (812).

Then, in the step (811), an affirmative judgment and a confirmation date are stored in an item of the confirmation history of the original registration file 121. Next, in the step (813), the judgment result confirmed in the steps (808) and (809) is notified to the user PC 100, and the process ends.

On the other hand, when it is judged that the registration number is NG in the step (808), a negative judgment and the confirmation date are stored in an item of the confirmation history of the original registration file 121 in the step (812), thereafter a flow advances to the step (813).

Second Embodiment

In the first embodiment, a case of printing an update registration confirmation result by text data has been explained as shown in FIGS. 11 and 12, however, a new registration confirmation result can be also printed.

Figure 14:
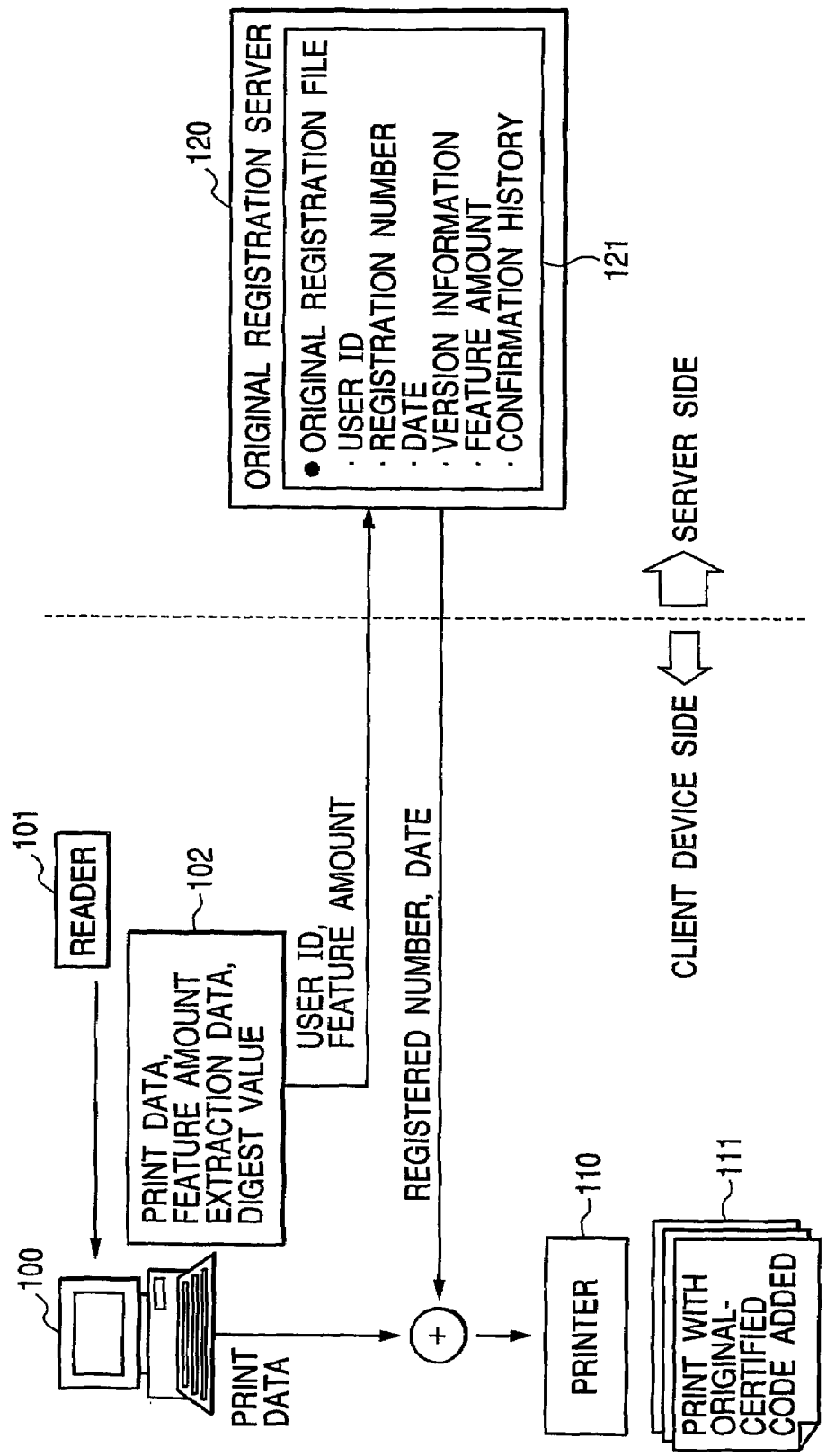
FIG. 14 is a block diagram for explaining the structure of an image processing system according to the second embodiment of the present invention.

FIG. 14 is a block diagram for explaining the structure of an image processing system according to the second embodiment of the present invention. In FIG. 14, the same structural components as those in FIG. 1 are denoted by the same numerals.

A point which is different from that in the first embodiment is the contents of an original registration file 121 managed by an original registration server 120, and data of which items are different from those in the original registration file 121 shown in FIG. 1 is managed.

Figure 15:
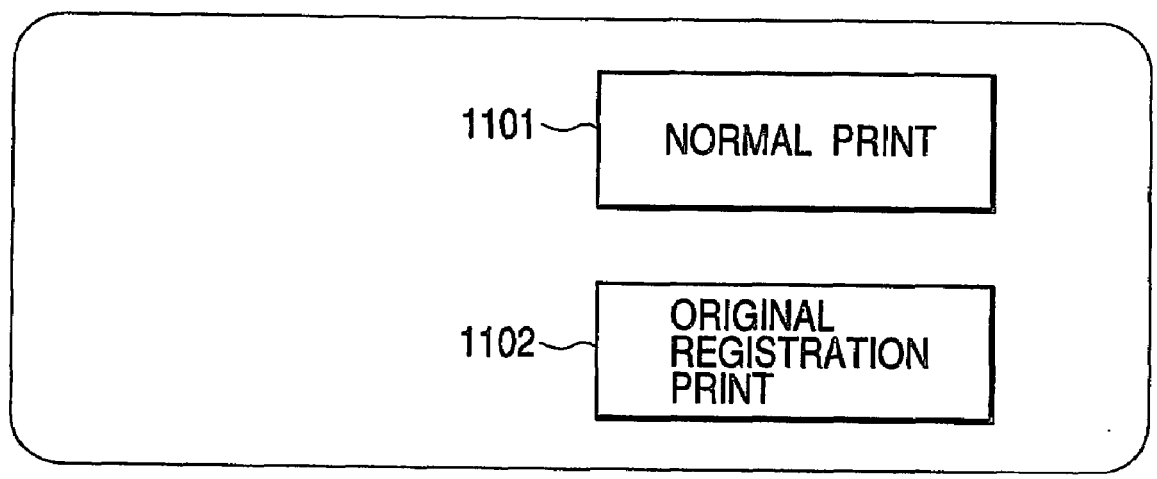
FIG. 15 is a diagram showing an example of a second print attribute selection screen displayed on the CRT shown in FIG. 3.

FIG. 15 is a diagram showing an example of a first print attribute selection screen displayed on the CRT 10 shown in FIG. 3, and that screen is assumed to be displayed as a user interface by, e.g., printer driver software loaded from an external memory 11 onto a RAM 2.

In FIG. 15, numeral 1101 denotes a normal print button, and when the button 1101 is depressed to issue an instruction, a printer 110 produces print data which can be output, from output information which is output from application software of a user personal computer (PC) 100 shown in FIG. 14 and then the produced data is output by the printer 110.

Figure 16:
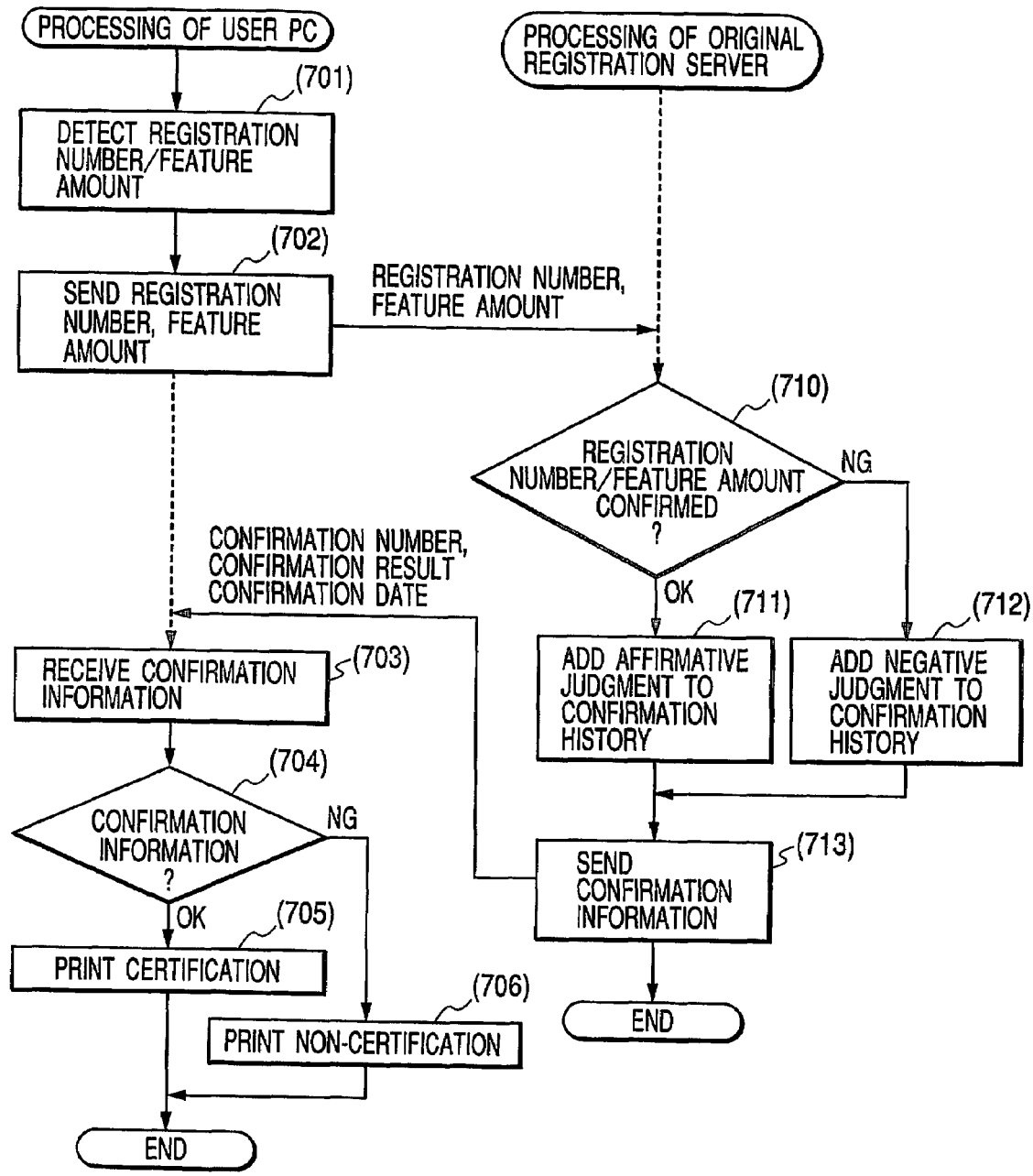
FIG. 16 is a flow chart showing an example of a fourth data processing procedure in the image processing system according to the present invention.

FIG. 16 is a flowchart showing an example of a fourth data processing procedure in an image processing system according to the present invention. Here, it should be noted that the fourth data processing procedure corresponds to the processing procedure in a series of original registration confirmation processing of the prints between the user PC 100 and the original registration server 120 shown in FIG. 14, steps (701) to (706) are the steps to be executed on the side of the user PC 100, and steps (710) to (713) are the steps to be executed on the side of the original registration server 120. Incidentally, it is assumed that a control program for controlling these steps is loaded from the external memory 11 or the like onto the RAM 2 and then executed by the CPU 1. Hereinafter, a print process will be explained in detail.

Initially, in the step (701), a print 111 with original-certified code added which is output from the printer 110 is read by a reader 101 and, e.g., data of the registration number and date and a message digest value on a header area are extracted. Then, in the step (702), the data extracted in the step (701) is sent to the original registration server 120. Then, in the step (703), a confirmation result in the original registration server 120 is received.

Next, in the step (704), when it is judged that confirmation information received from the original registration server 120 is affirmative, a registration confirmation certification is printed by the printer 110 with a format shown in FIG. 17 in the step (705) then the process ends.

On the other hand, in the step (704), when it is judged that the confirmation information is negative, a registration unconfirmed certification (non-certification) s printed with a format shown in FIG. 13 in the step (706).

FIG. 17 is a diagram showing an example of the printed result of a registration confirmation certification in the image processing system according to the present invention, and FIG. 17 indicates an example of the confirmation is OK, FIG. 13 indicates an example of the confirmation is NG.

Hereinafter, processes executed in the original confirmation server 120 indicated in steps (710) to (713) will be explained.

Initially, in the step (710), data of the registration number and date 402 sent from the user PC 100 and a message digest value 405 are received, and the received information is checked with the contents of the original registration file 121 to judge whether or not they are coincident with each other. When it is judged that they are coincident with each other, an additional process of storing information of an affirmative judgment and the confirmation date in an item of confirmation history of the original registration file 121 is executed in the step (711), and the judgment result confirmed in the step (710) is notified to the user PC 100 in the step (713), and the process ends.

On the other hand, when it is judged that they are not coincident with each other in the step (710), information of a negative judgment and the confirmation date are stored in an item of the confirmation history of the original registration file 121 in the step (712), and the judgment result confirmed in the step (710) is notified to the user PC 100 in the step (713), and the process ends.

Third Embodiment

FIG. 18 is a diagram showing an example of the printed result of a registration confirmation certification in an image processing system according to the present invention. As shown in FIG. 17 in the second embodiment, it is an example of adding a registration confirmation result to an entire area of a print image with thin density characters instead of printing a registration confirmation certification by an ordinary printing form.

In the present embodiment, the registration confirmation result in FIG. 17 is added to an entire area of the print image with thin density characters as indicated by an area 1001 shown in FIG. 18. Accordingly, it becomes possible to falsify the registration confirmation result becomes difficult.

Fourth Embodiment

In the fourth embodiment, a signature section (signature area) is added in order to further increase the reliability of security for the prints. After a user signed own name or the like in the signature section (signature area) by handwriting, a signed part is stored in an original registration server as data.

Figure 19:
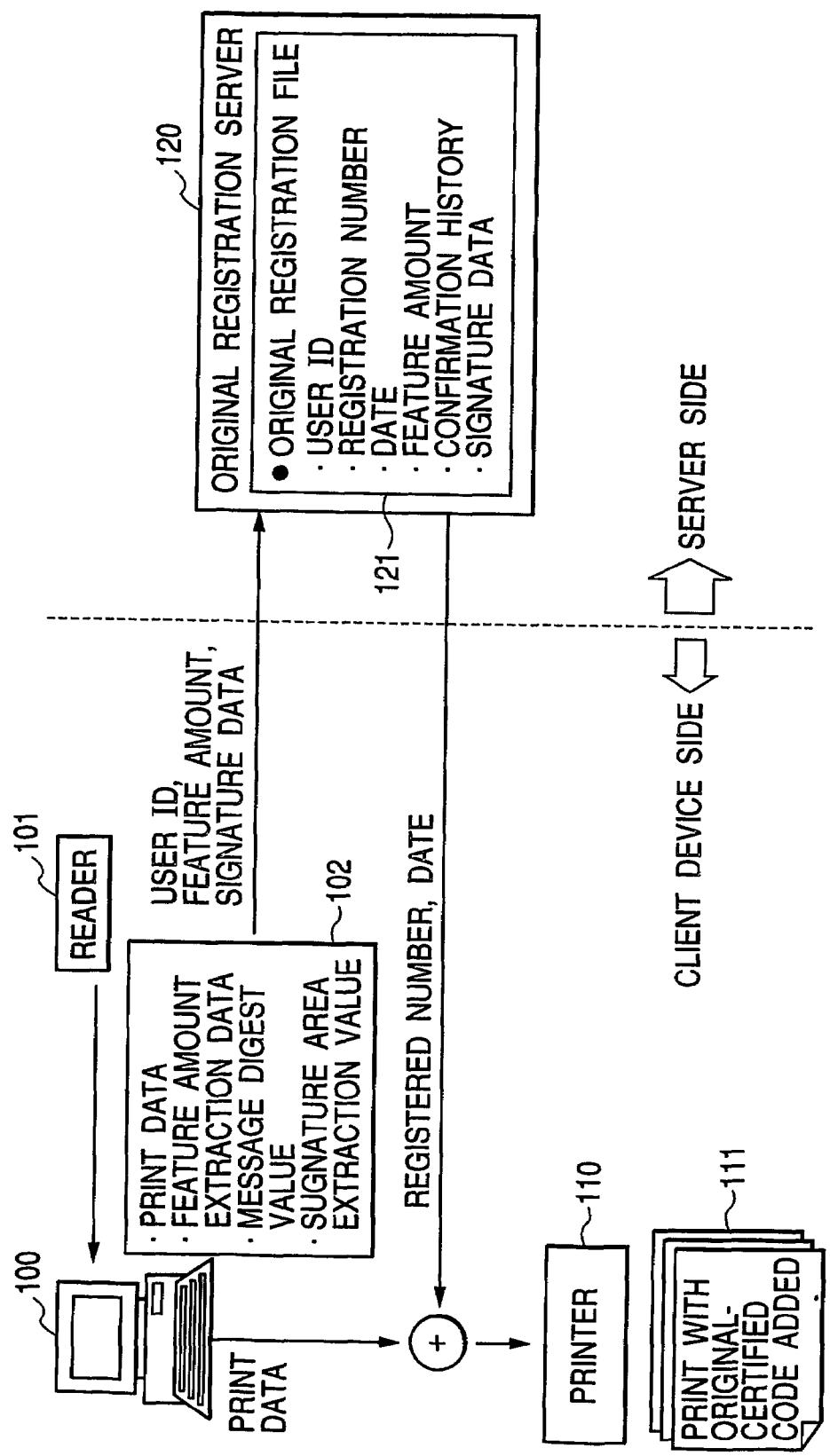
FIG. 19 is a block diagram for explaining the structure of an image processing system according to the fourth embodiment of the present invention.

FIG. 19 is a block diagram for explaining the structure of an image processing system according to the fourth embodiment of the present invention. In FIG. 19, the same structural components as those in FIG. 1 are denoted by the same numerals.

A point which is different from that in the first embodiment is the contents of an original registration file 121 which is managed by an original registration server 120, and data of which items are different from those in the original registration file 121 shown in FIG. 1 is managed.

The structure of the system is also same as that shown in FIG. 3.

Figure 20:
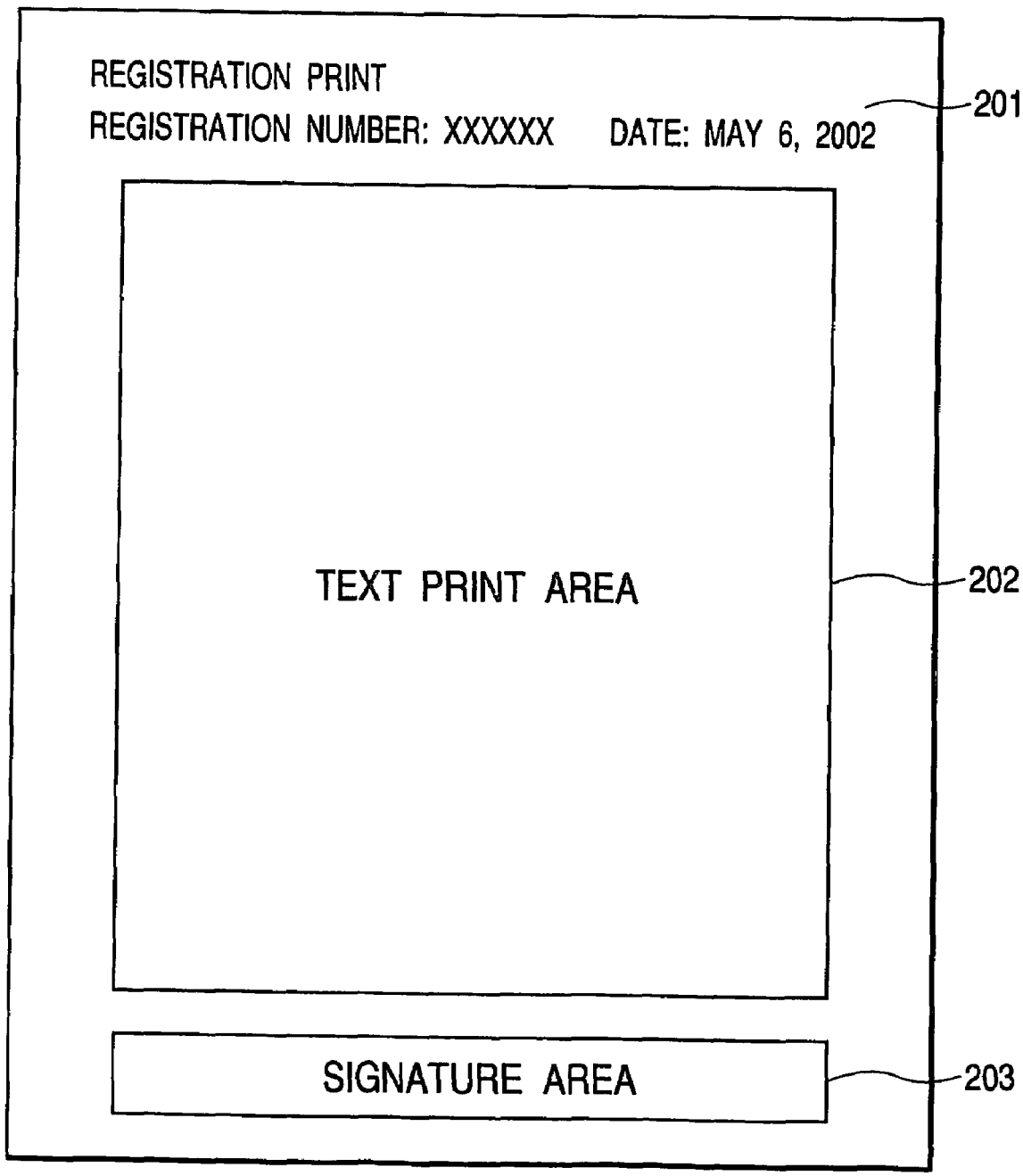
FIG. 20 is a diagram for explaining the content of a print which is output from a printer shown in FIG. 19 and to which an original certification code has been added.

FIG. 20 is a diagram for explaining the print content of a print 111 with original-certified code added which is output from the printer 110 shown in FIG. 1.

In FIG. 20, numeral 201 denotes a certification contents area, which indicates such an example where a text output area for a print number and date information obtained from the original registration server 120 is secured in, e.g., a header area of a sheet. Numeral 202 denotes a text print area where print data obtained after performing an image process in a user personal computer (PC) 100 for image data which is input from a reader 101 shown in FIG. 19 is given.

Numeral 203 denotes a signature area where the user signs own name or the like using writing materials, and signature data which is recorded in the area 203 is transmitted to the original registration server 120 as described later to be utilized to confirm the user.

Then, according to an operation based on such screens which are shown in FIGS. 5, 15 and the like, an original registration print is performed in accordance with a procedure shown in FIG. 4. However, in the present embodiment, in the step (313), only the signature data among items in an original registration file 121 is stored with a state of blank in the first time.

Figure 21:
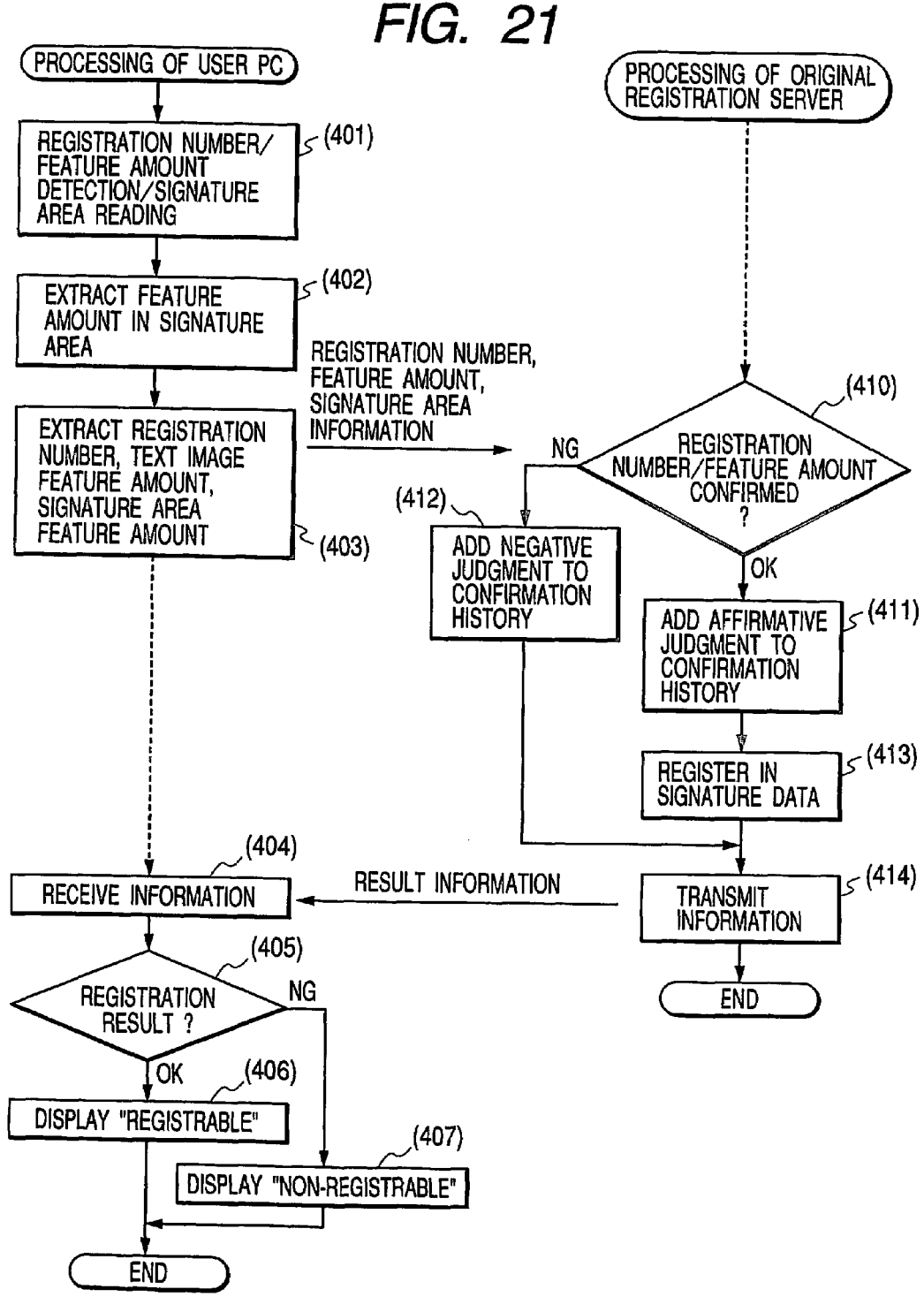
FIG. 21 is a flow chart showing an example of a fifth data processing procedure in the image processing system according to the present invention.

FIG. 21 is a flow chart showing an example of a fifth data processing procedure in the image processing system according to the present invention. Here, it should be noted that the fifth data processing procedure corresponds to the processing procedure in a series of image processing between the user PC 100 and the original registration server 120 shown in FIG. 19, steps (401) to (407) are the steps to be executed on the side of the user PC 100, and steps (410) to (414) are the steps to be executed on the side of the original registration server 120. Incidentally, it is assumed that a control program for controlling these steps is loaded from an external memory 11 or the like onto a RAM 2 and then executed by the CPU 1. Hereinafter, a signature registration process will be explained in detail.

Figure 22:
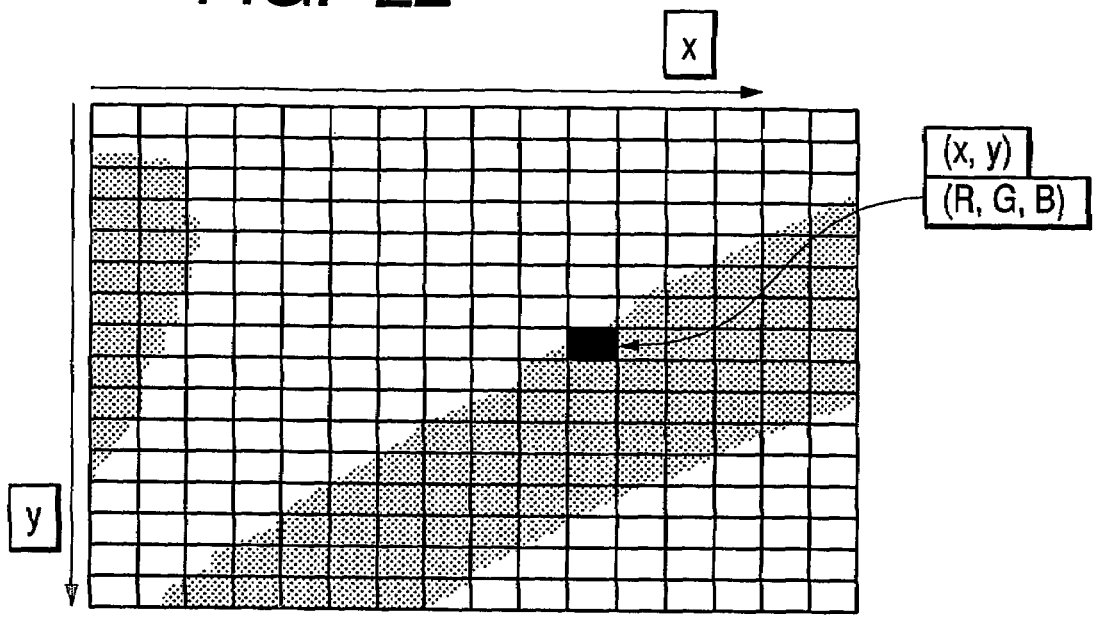
FIG. 22 is a diagram for explaining a signature registration extraction method in the image processing system according to the present invention.

Initially, in the step (401), the print 111 with original-certified code added which is output from the printer 110 is read by the reader 101 and, e.g., data of the registration number and date 402 and a message digest value 404 which becomes a feature amount on the header area and image data in the signature area are extracted. Then, in the step (402), for the image data in the signature area, the inside of an area for a signature data image secured on the RAM 2 is divided into blocks composed of plural images as shown in FIG. 22, and color information (R, G, B) and block coordinates (x, y) are extracted as the feature amount.

Next, in the step (403), a registration number, a text image feature amount and a signature area feature amount are sent to the original registration server 120.

Then, in the step (404), result information at the original registration server 120 is received. Next, in the step (405), a registration result is judged from the result information received from the original registration server 120, and when it is judged that the registration result is affirmative, a message of "signature could be registered" indicating the registration confirmation is displayed on a CRT 10 as shown in FIG. 23A in the step (406) and the process ends.

Figure 23A:
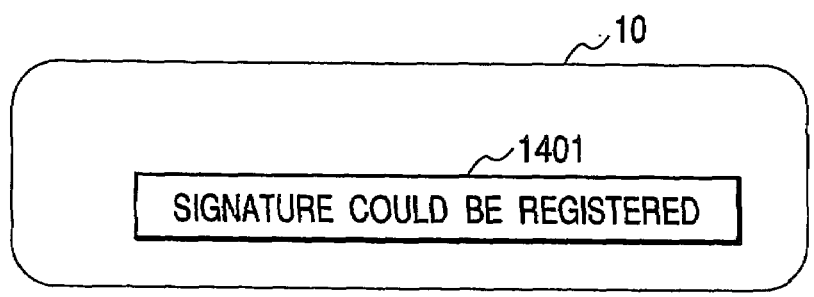
FIGS. 23A and 23B are diagrams showing a signature registration confirmation result display screen in the image processing system according to the present invention.
Figure 23B:
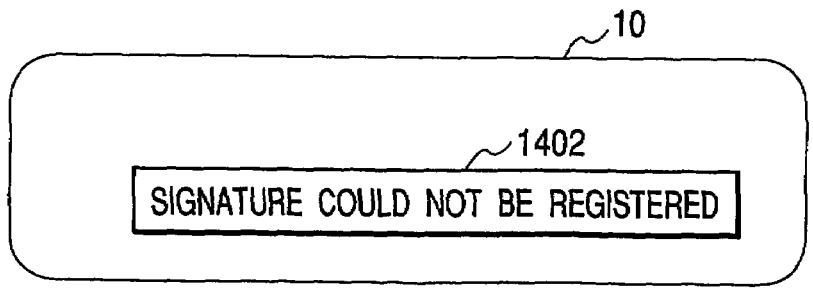

On the other hand, in the step (405), when it is judged that the registration result is NG, a message of "signature could not be registered" indicating the registration confirmation is displayed on the CRT 10 as shown in FIG. 23B in the step (407), and the process ends.

FIGS. 23A and 23B are diagrams showing a signature registration confirmation result display example in the image processing system according to the present invention. FIG. 23A is a display example for a message of the signature registration is OK, and FIG. 23B is a display example for a message of the signature registration is NG.

Hereinafter, processes executed in the original registration server 120 indicated in the steps (410) to (414) will be explained.

Initially, in the step (410), the data of the registration number and date 402, the message digest value 404 and signature area information sent from user PC 100 are received, and the data of the registration number and date 402 and the message digest value 404 are checked with the contents (other than signature data) of the original registration file 121 to judge whether or not they are coincident with each other. When it is judged that they are coincident with each other, a registration affirmative judgment and date data are stored in an item of confirmation history of the original registration file 121 in the step (411).

Then, in the step (413), the signature area information which was sent is registered in the signature data. Then, in the step (414), a confirmed judgment result is notified to the user PC 100, and the process ends.

On the other hand, when it is judged that they are not coincident with each other in the step (410), a registration negative judgment and date data are stored in an item of confirmation history of the original registration file 121, and a flow advances to the step (414) where a confirmed judgment result is notified to the user PC 100, and the process ends.

Accordingly, feature information of signature of an original registration user is registered in the original registration server 120 as a file.

Figure 24:
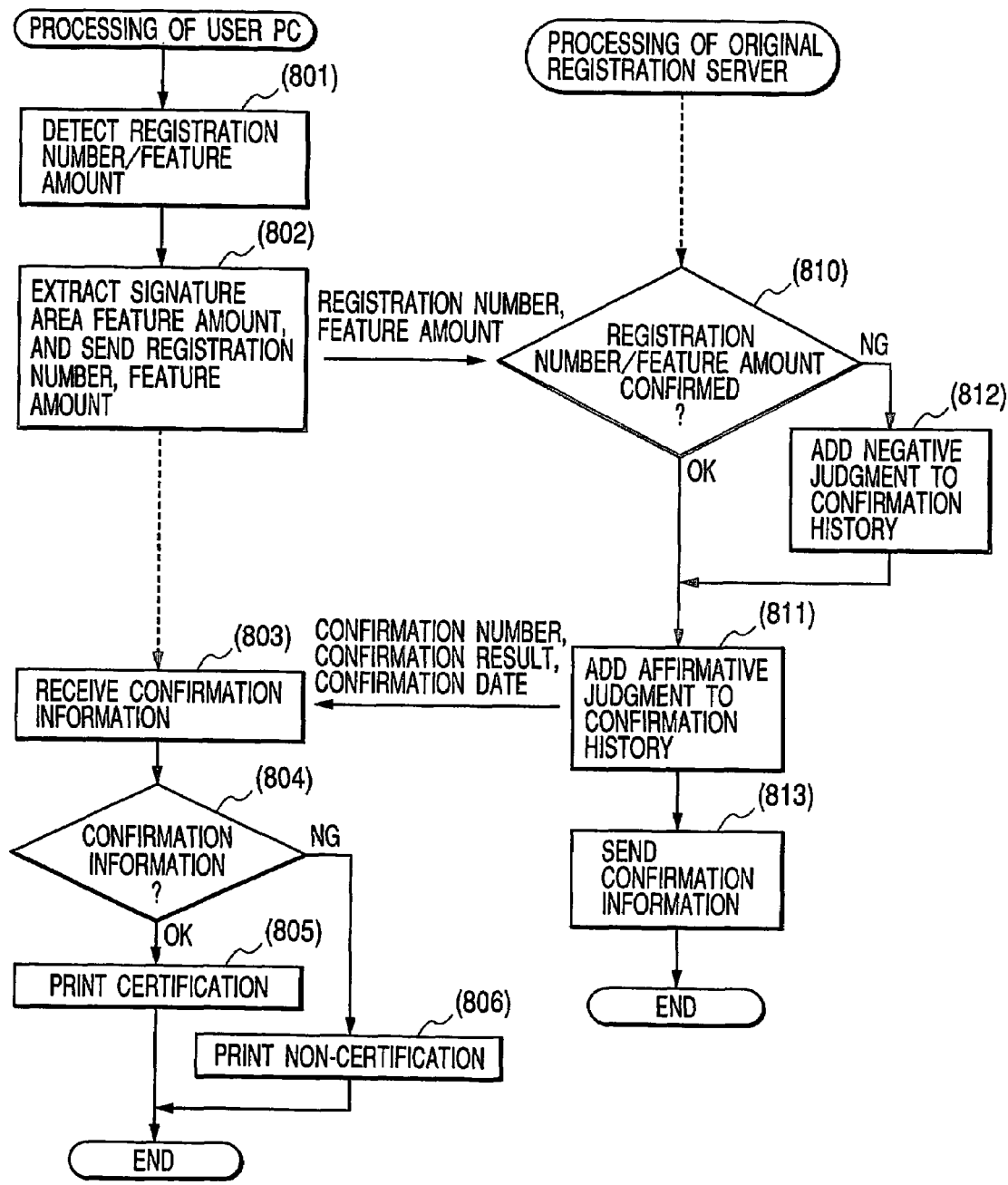
FIG. 24 is a flow chart showing an example of a sixth data processing procedure in the image processing system according to the present invention.

FIG. 24 is a flowchart showing an example of a sixth data processing procedure in the image processing system according to the present invention. Here, it should be noted that the sixth data processing procedure corresponds to the processing procedure in a series of image processing between the user PC 100 and the original registration server 120 shown in FIG. 19, steps (801) to (806) are the steps to be executed on the side of the user PC 100, and steps (810) to (813) are the steps to be executed on the side of the original registration server 120. Incidentally, it is assume that a control program for controlling these steps is loaded from the external memory 11 or the like onto the RAM 2 and then executed by the CPU 1. Hereinafter, a print process will be explained in detail.

Initially, in the step (801), the print 111 with original-certified code added which is output from the printer 110 is read by the reader 101 and, e.g., the data of the registration number and date 402 and the message digest value 404 on the header area are extracted. Then, in the step (802), for the image data in the signature area 203 on the print 111 with original-certified code added, the inside of the area is divided into blocks composed of plural images as shown in FIG. 22, and the color information (R, G, B) and the block coordinates (x, y) are extracted as the feature amount, which are sent to the original registration server 120 together with the data extracted in the step (801).

Then, in the step (803), confirmation information at the original registration server 120 is received.

Next, in the step (804), the contents of the confirmation information received from the original registration server 120 is judged, and when it is judged that the confirmation information is affirmative, a registration confirmation certification is printed by the printer 110 with a format shown in FIG. 11, 12, 17, 18 or the like in the step (805), and the process ends.

On the other hand, when it is judged that the confirmation information is negative in the step (804), a registration unconfirmed certification (non-certification) is printed with a format shown in FIG. 13 and the like in the step (806), and the process ends.

Hereinafter, processes executed in the original registration server 120 indicated in the steps (810) to (813) will be explained.

Initially, in the step (810), the data of the registration number and date 402 and the message digest value 404 sent from the user PC 100 and the color information and the coordinate information (FIG. 22) with a block unit being the feature amount in the signature area are received, and the received information is checked with the contents of the original registration file 121 to judge whether or not they are coincident with each other. When it is judged that they are coincident with each other, an additional process of storing an affirmative judgment and confirmation date data in an item of confirmation history of the original registration file 121 is executed in the step (811) and the confirmation information result (includes confirmation number, confirmation result and confirmation date) confirmed in the step (810) is notified to the user PC 100 in the step (813), and the process ends.

On the other hand, in the step (810), when it is judged that they are not coincident with each other, a negative judgment and confirmation date data are stored in an item of confirmation history of the original registration file 121 in the step (812) and the confirmation information result (includes confirmation number, confirmation result and confirmation date) confirmed in the step (810) is notified to the user PC 100 in the step (813), and the process ends.

Fifth Embodiment

In the fifth embodiment, a date of the registration already stored is added when original security registered data is reprinted.

Figure 25:
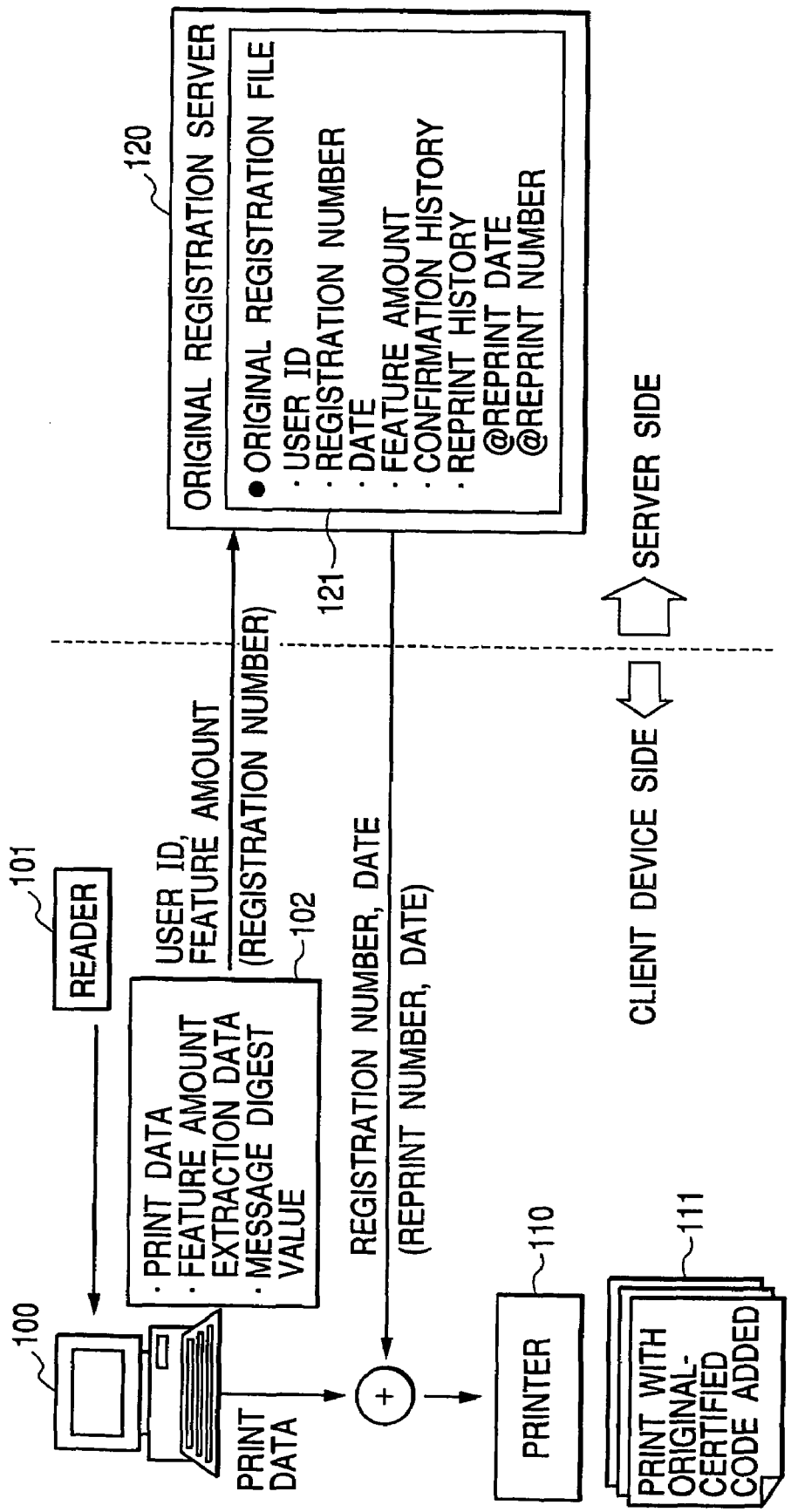
FIG. 25 is a block diagram showing the structure of an image processing system according to the fifth embodiment of the present invention.

FIG. 25 is a block diagram showing the structure of an image processing system according to the fifth embodiment of the present invention. In FIG. 25, the same structural components as those in FIG. 1 are denoted by the same numerals.

A point which is different from that in the first embodiment is the contents of an original registration file 121 which is managed by an original registration server 120, and data of which items are different from those in the original registration file 121 shown in FIG. 1 is managed.

The structure of the system is also same as that shown in FIG. 3.

An original registration process and a printing process are also same as those described in the above.

Figure 26:
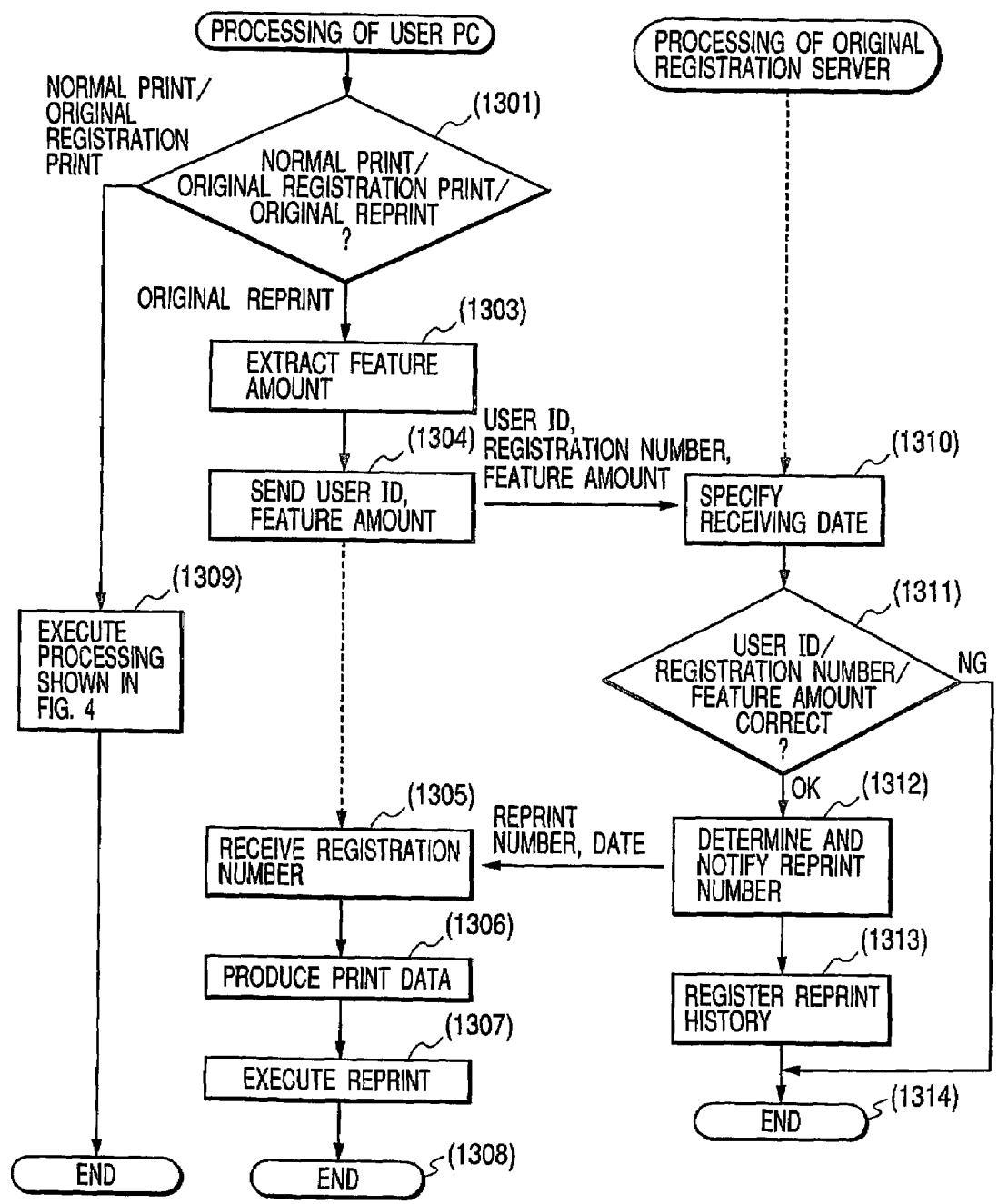
FIG. 26 is a flow chart showing an example of a seventh data processing procedure in the image processing system according to the present invention.

FIG. 26 is a flowchart showing an example of a seventh data processing procedure in the image processing system according to the present invention. Here, it should be noted that the seventh data processing procedure corresponds to the processing procedure in a series of reprinting between a user personal computer (PC) and an original registration server 120 shown in FIG. 25, steps (1301) to (1309) are the steps to be executed on the side of the user PC 100, and steps (1310) to (1314) are the steps to be executed on the side of the original registration server 120. Incidentally, it is assumed that a control program for controlling these steps is loaded from the external memory 11 or the like onto the RAM 2 and then executed by the CPU 1. Hereinafter, a print process will be explained in detail.

Figure 27:
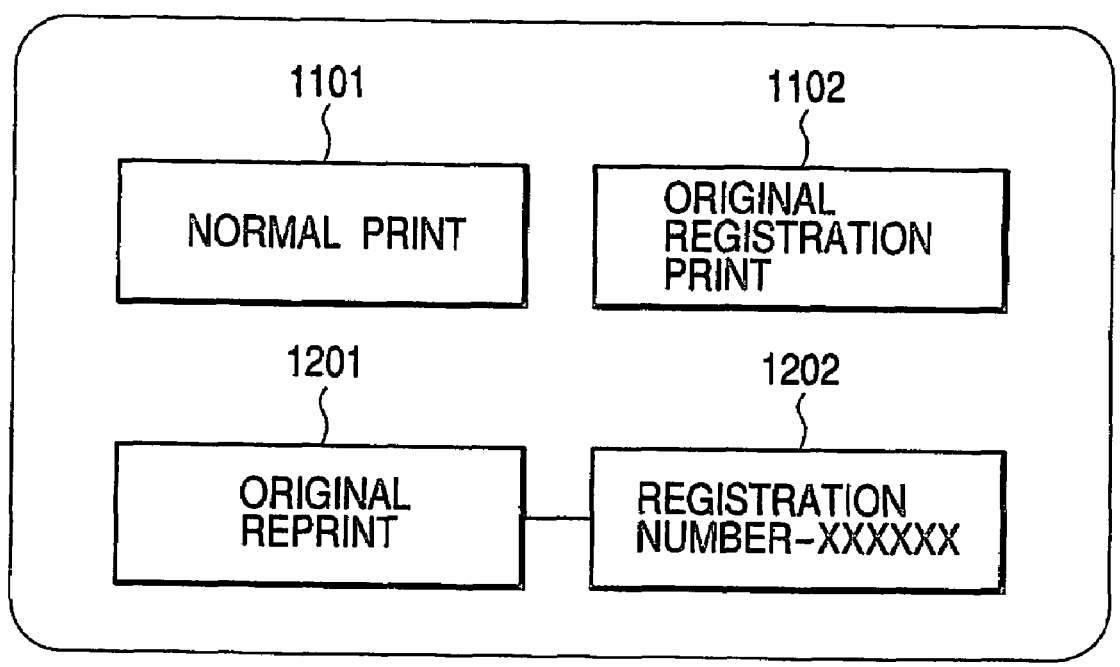
FIG. 27 is a diagram showing an example of a third print attribute selection screen displayed on the CRT shown in FIG. 3.

FIG. 27 is a diagram showing an example of a third print attribute selection screen displayed on the CRT shown in FIG. 3, and that screen is assumed to be displayed as a user interface by, e.g., printer driver software loaded from the external memory 11 onto the RAM 2. In FIG. 27, the same buttons as those in FIG. 5 are denoted by the same numerals.

In FIG. 27, numeral 1201 denotes an original reprint button, and when the button 1201 is selected, a user ID already set for a user of the user PC 100, a message digest value to be extracted and registration number data 1202 which is input are sent to the original registration server 120.

Initially, in the step (1301), the user selects a normal print, an original registration print or an original reprint by an instruction of depressing buttons by an operation screen displayed on a CRT 10 of the user PC shown in FIG. 27.

When it is judged that the user selects the original reprint, processes in the steps (1303) to (1308) are executed.

When it is judged that the user selects the normal print or the original registration print in the step (1301), a process when an original is registered shown in FIG. 4 is executed, and the process ends.

On the other hand, in the step (1301), when it is judged that the user selects the original reprint by an instruction from the original reprint button, a hash conversion is performed based from print data by a method shown in FIG. 7, and a message digest value 404 is extracted as the feature amount.

Then, in the step (1304), the user ID already set in the user PC 100, the digest value extracted in the step (1303) and the registration number data 1202 which is input on the screen shown in FIG. 27 are sent to the original registration server 120.

Then, in the step (1305), a reprint number and an original registration date issued by the original registration server 120 is received.

Figure 28:
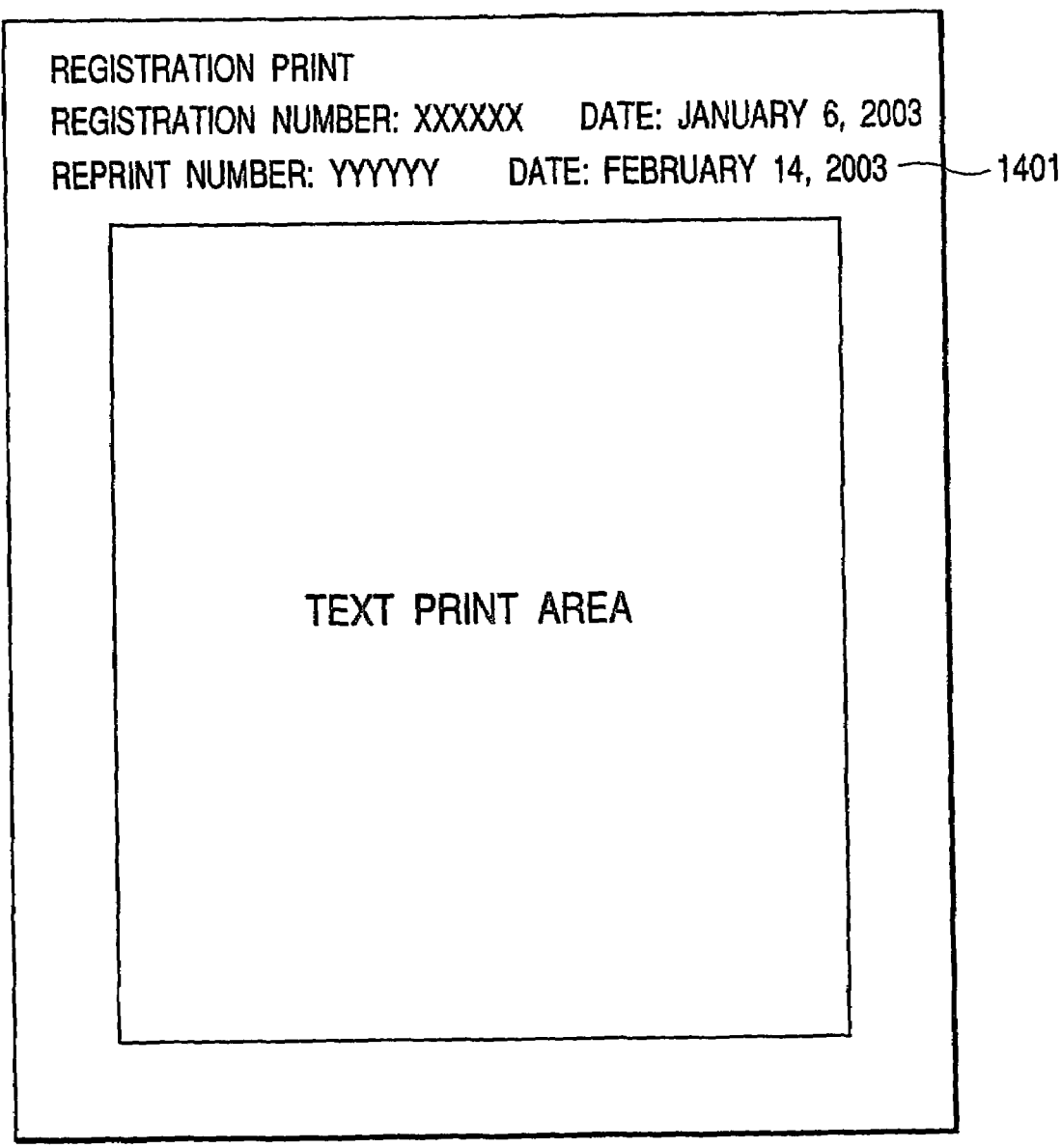
FIG. 28 is a diagram showing an example of print data generated by a user personal computer shown in FIG. 25.

FIG. 28 is a diagram showing an example of print data generated by the user PC 100 shown in FIG. 25.

In FIG. 28, numeral 1401 denotes a certification area where the text for certifying that the print is a reprint of the registration print is printed.

Then, in the step (1307), the printer 110 prints the produced print data, and the process ends in the step (1308). Accordingly, a reprint result shown in FIG. 28 is obtained.

Hereinafter, processes executed in the original registration server 120 indicated in the steps (1310) to (1314) will be explained.

Initially, in the step (1310), a date of receiving data from the user PC 100 is specified. Then, in the step (1311), it is inspected whether or not the user ID, the feature amount and the registration number data are correct. When it is judged that the user ID is not correct, a flow advances to the step (1314), and the process ends.

On the other hand, in the step (1311), when it is judged that the user ID is correct, a reprint number is determined in the step (1312) and data of the reprint number is sent to the user PC 100. Then, in the step (1313), a reprint history is stored in the original registration file 121 shown in FIG. 25, and a flow advances to the step (1314), and the process ends.

Also, in the present embodiment, it is needless to say that it may be structured that a registration confirmation result is added to an entire area of a print image with thin density characters as shown in FIGS. 11, 12 and 18.

Sixth Embodiment

In the sixth embodiment, when a user ID is registered from a user PC 100, restriction information for restricting a print process with an original certificate added is registered in an original registration server 120 with respect to each user. According to the present embodiment, when reprint is requested from the user PC 100, it is possible to restrict the print process by referring the registered restriction information.

Figure 29:
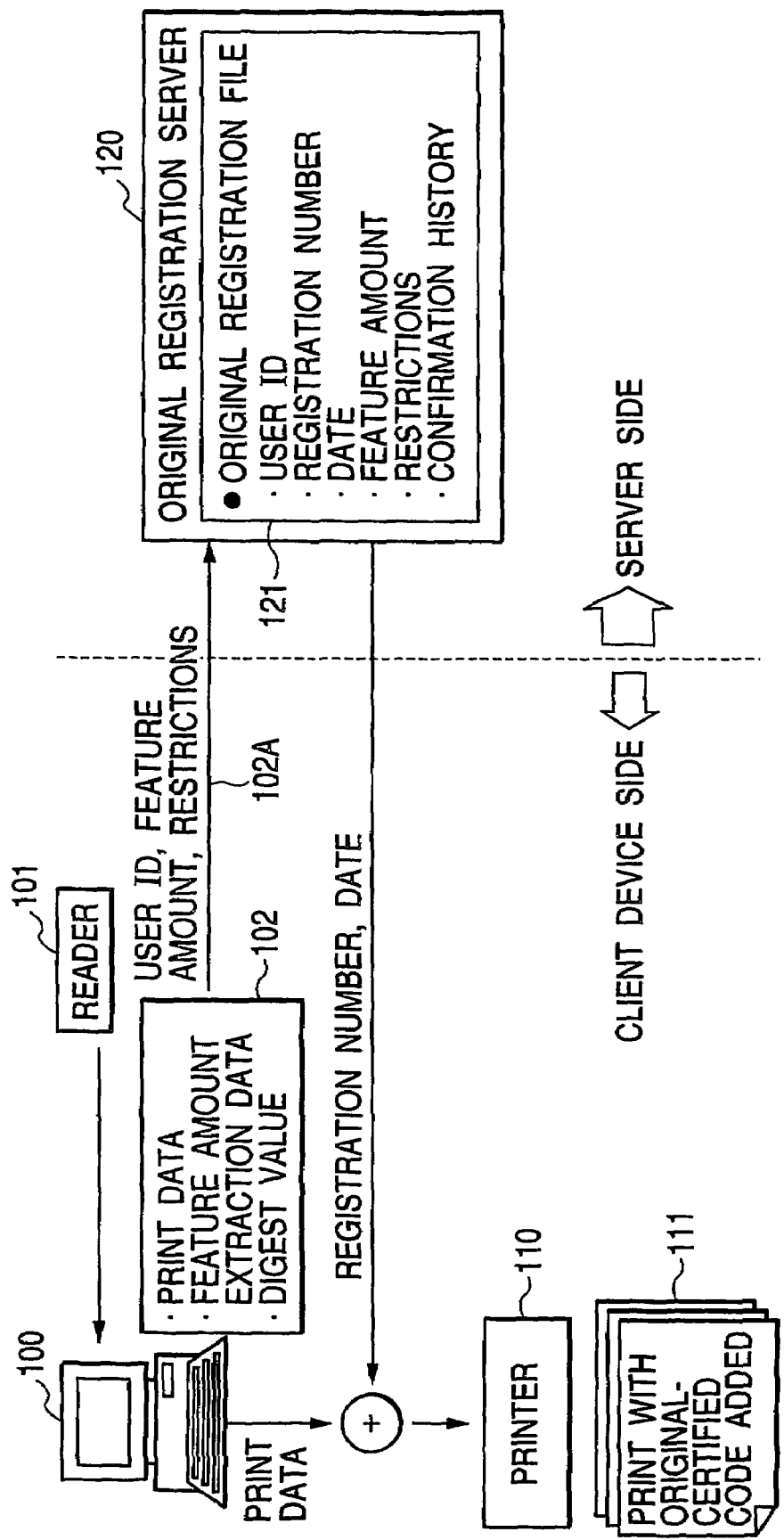
FIG. 29 is a block diagram for explaining the structure of an image processing system according to the sixth embodiment of the present invention.

FIG. 29 is a block diagram for explaining the structure of an image processing system according to the sixth embodiment of the present invention. In FIG. 29, the same structural components as those in the first embodiment are denoted by the same numerals and symbols as those shown in FIG. 1.

In FIG. 29, the point different from FIG. 1 is that the information input from the user PC 100 and transmitted to the original registration server includes restriction data (or restricted matter data). Here, it should be noted that the restrictions may include, e.g., the maximum number of print permission, the maximum number of times of printing permitted, other users who are permitted to perform printing, a date of printing (e.g., on and after Feb. 28, 2003), and the like. Here, it should be noted that the restrictions are not limited to the above, that is, such information as above can be appropriately combined, and a printing time zone, color/monochrome printing, a text size, layout output and the like may be included in the restrictions.

Incidentally, the data which can be set as the restrictions should be input when a feature amount is registered in the original registration server 120, that is, when the print data input from a reader 101 is first printed. In other words, the restriction information is not input when second and following printings are performed.

Then, in the original registration server 120, the input restrictions are added as an original registration file 121, and this file is registered in an external memory of the original registration server 120 with respect to each user on the basis of the restriction data transmitted from the user PC 100.

Figure 30:
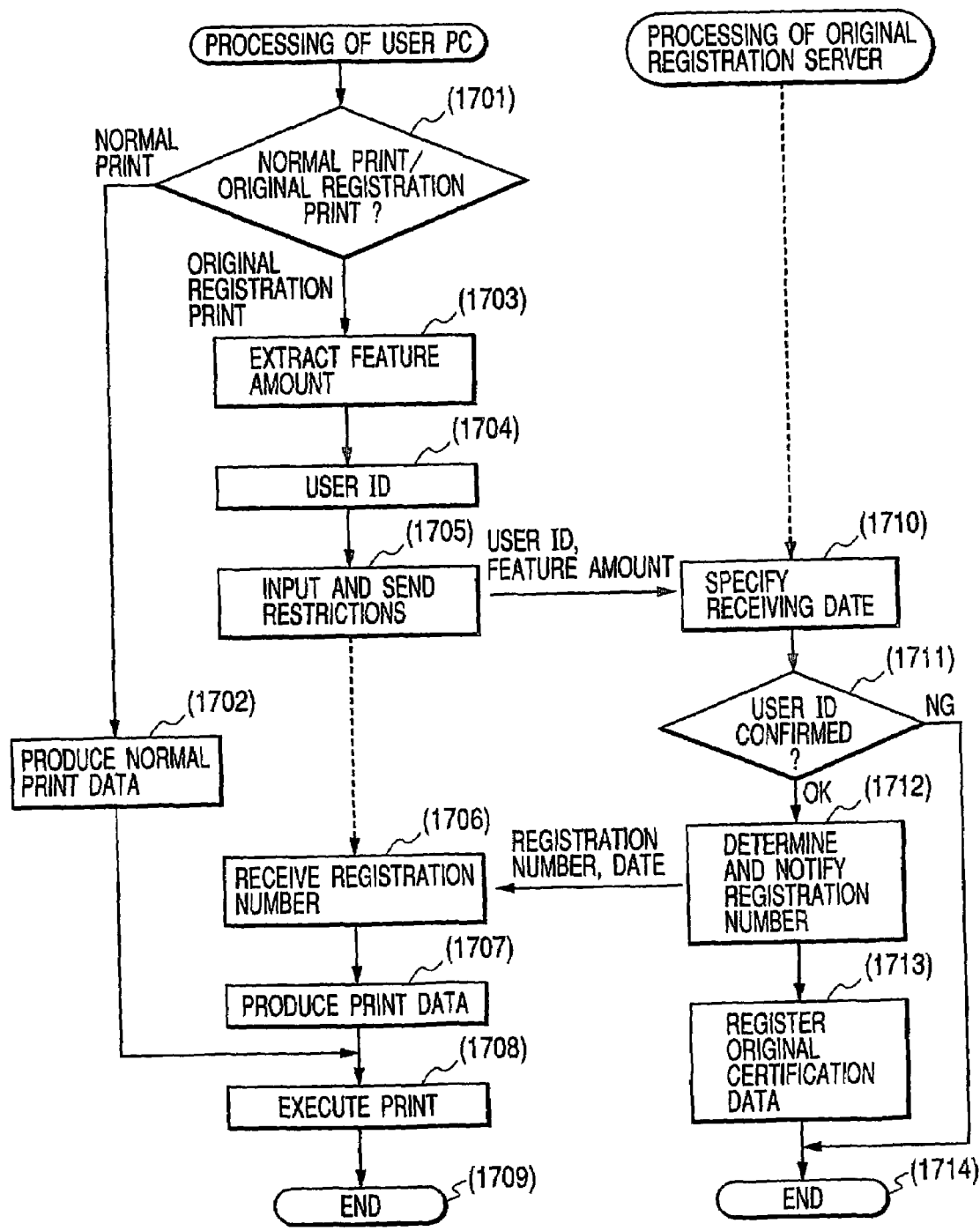
FIG. 30 is a flow chart showing an example of an eighth data processing procedure in the image processing system according to the present invention.

FIG. 30 is a flow chart showing an example of an eighth data processing procedure in the image processing system according to the present invention. Here, it should be noted that the eighth data processing procedure corresponds to the processing procedure in a series of reprinting between the user PC 100 and the original registration server 120 shown in FIG. 29, steps (1701) to (1709) are the steps to be executed on the side of the user PC 100, and steps (1710) to (1714) are the steps to be executed on the side of the original registration server 120. Incidentally, it is assumed that a control program for controlling these steps is loaded from an external memory 11 or the like onto a RAM 2 and then executed by a CPU 1. Hereinafter, the print process will be explained in detail.

First, in the step (1701), the operation screen shown in FIG. 5 and the like is displayed on a CRT 10 of the user PC 100, and a user then selects either normal printing or original registration printing by using an original registration print button 1102 or a normal print button 1101. When the user selects the original registration printing, the process in the steps (1703) to (1706) is performed. On one hand, when the user selects the normal printing, the flow advances to the step (1702) to produce only print data of a text print area 202 shown in FIG. 2 and the like, and then the flow advances to the step (1708).

More specifically, when the user selects the original registration printing in the step (1701), the flow advances to the step (1703) to perform the hash conversion based on the print data in the method of FIG. 6, and then extract a message digest value as the feature amount.

Then, when a user ID already set in the user PC is extracted in the step (1704) and the above restrictions are input by the user in the step (1705), the digest value (feature amount) extracted in the step (1703), the user ID and the restrictions are sent to the original registration server 120.

Next, a registration number issued by the original registration server 120 is received in the step (1706), and the print data in the certification contents area 201 and the text print area 202 both shown in FIG. 2 and the like are produced in the step (1707). Then, in the step (1708), a print process is performed by a printer 110 based on the print data produced in the step (1707), and the process ends.

Hereinafter, the process of the original registration server 120 in the steps (1710) to (1714) will be explained.

First, in the step (1710), the date when the data (including the message digest value (feature amount), the user ID, and the restrictions) is received from the user PC 100 is specified. Then, it is confirmed in the step (1711) whether or not the user ID sent from the user PC 100 is correct. When it is confirmed that the user ID is not correct, the process ends in the step (1714).

Incidentally, when the user ID is confirmed, it is further judged in, e.g., the step (1311) of FIG. 26, whether or not printing can be permitted from the current state (i.e., print administration information (the number of times of printings, the number of copies, etc.)) of the printer 110 which administrates the restrictions based on registered restrictions 102A.

Then, it is assumed that, when it is judged that the printing can be permitted, a reprint number and the date are notified to the user PC 100.

Meanwhile, when it is confirmed in the step (1711) that the user ID is correct, the flow advances to the step (1712) and further to the step (1713).

More specifically, in the step (1712), a registration number is uniquely determined based on the receiving date and the user ID and then sent to the user PC 100. Next, in the step (1713), the corresponding data is stored in the original registration file 121 shown in FIG. 29.

According to the above embodiment, when it is discriminated whether the printed material corresponds to the original, it is unnecessary on the side of the original registration server to store the entire image of the original itself. For this reason, it is possible to certify with high accuracy that the printed material corresponds to the original even if a large memory capacity is not used.

Moreover, the original specifying information which includes the feature amount of the electronic data to be output from the printer, the old and new feature amounts extracted from the print image to which the original-certified information has been added, and the user ID for discriminating the print requester of the electronic data is sent to the server apparatus, it is administrated to be able to update the old (former) original specifying information administrated in the server apparatus into the new original specifying information based on the new feature amount, and it is controlled to produce the print data to be output to the printer on the basis of the original specifying information notified from the server apparatus. Therefore, when the user causes the server apparatus to print the electronic data according to the latest original specifying information registered in updatable manner, it is possible to reproducibly perform the original-certified printing by which the printed result that the original-certified information obtained by the verification according to the latest original specifying information has been added to the electronic data can be easily obtained at any time.

Moreover, the means for storing the feature amount of the electronic data and the print-produced date in the original registration server when the electronic data is actually printed is provided, whereby it is possible to structure the original registration system by which the conventional inconvenience that the entire former electronic data must be stored in the original registration server can be avoided. Therefore, it is possible to reduce the entire storage capacity and the risk of leak of secrets.

Furthermore, the signature area in which the signatures of an administrator and an acknowledger are added to the printed material is provided to increase reliability of the originality, whereby alteration of the data becomes difficult by registering the original together with the signature area.

Furthermore, with respect to "signature," the certification means conventionally recognized socially and widely and the electronic means are linked together. Thus, the certificate (guarantee) of date and the detection of alteration which are the weak points in the conventional signature certification are compensated, whereby it is possible to certainly and accurately certify the originality of image.

Thus, in case of again outputting the former electronic data without altering it, it is possible to prevent that the print production date is altered. Moreover, it is also possible to increase the reliability of originality by using not only the feature amount but also the signature.

Moreover, the feature amount of the electronic data to be output from the printer is first extracted, and the original specifying information including both the extracted feature amount and the user ID for discriminating the print requester of the electronic data is then transmitted to and administrated by the server. Subsequently, it is controlled to produce the print data to be output to the printer, based on the administration data notified from the server and the electronic data administrated by the server. Thus, when the user reprints the electronic data according to the original specifying information registered in the server, it is possible for the user to reproducibly perform the original-certified printing by which the printed result that the former-registered registration date has been added to the electronic data can be easily obtained.

Besides, it is possible to restrict the printing of the electronic data according to the restriction information designated by the user.

Incidentally, it is needless to say that the present invention can include all the differences of the structures in the above embodiments and also can appropriately select the part of these differences according to need.

Hereinafter, the structure of a data processing program which can be read by the image processing system to which the data processing apparatus and the server apparatus according to the present invention are applicable will be explained with reference to a memory map shown in FIG. 31.

Figure 31:
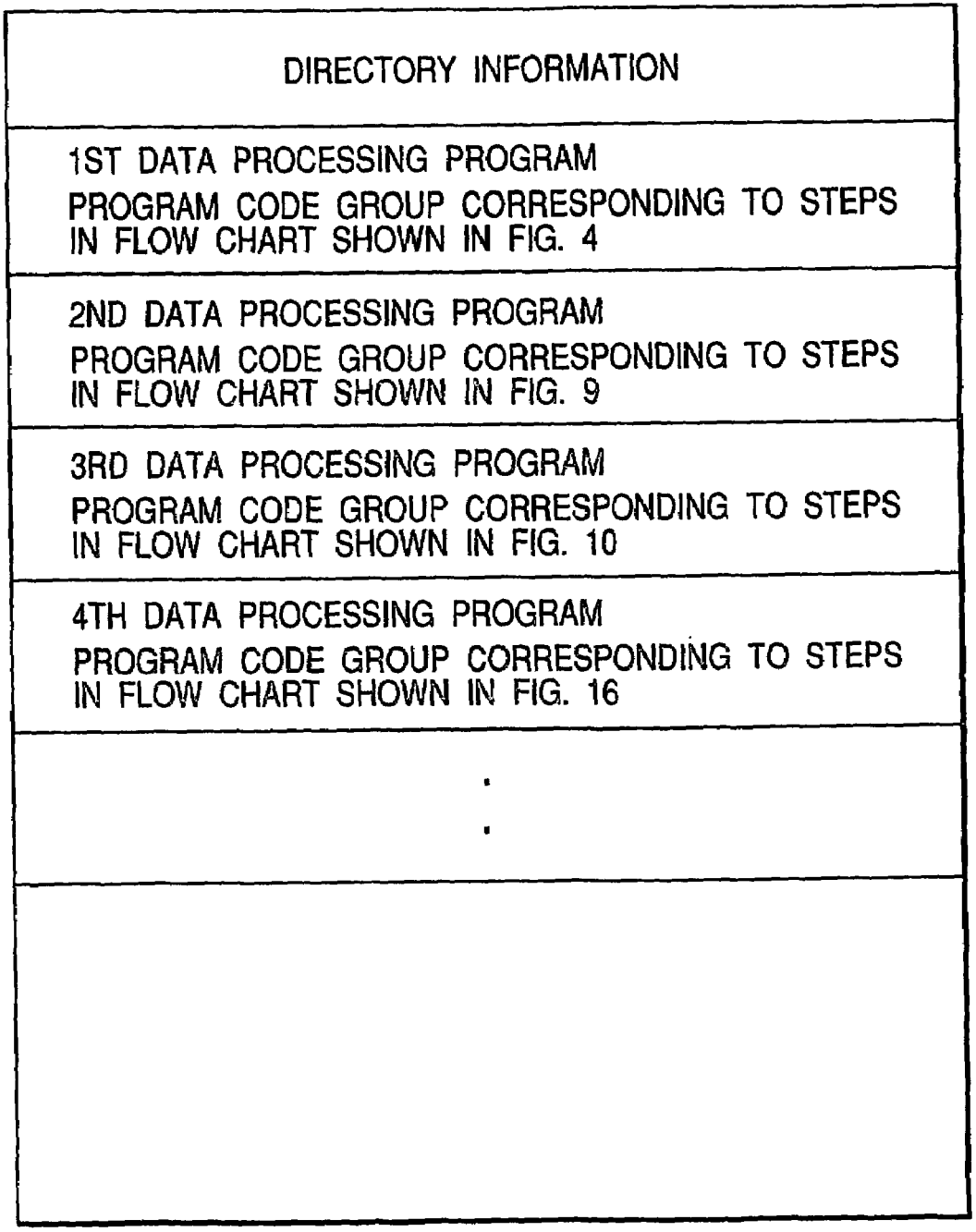
FIG. 31 is a diagram for explaining a memory map of a storage medium which stores various data processing programs capable of being read by the information processing apparatus according to the present invention.

That is, FIG. 31 is the diagram for explaining the memory map of the storage medium which stores the various data processing programs capable of being read by the information processing apparatus according to the present invention. Though FIG. 31 merely shows first to fourth data processing programs, it is possible to store the data processing programs other then the above data processing programs at the lower areas. Of course, it is possible not to store all the programs but to store a part of each of the programs, and it is also possible to store the programs in plural-divided storage media.

Incidentally, though it is not illustrated specifically, also information (including version information, creator information, etc.) for administrating the program groups stored in the storage medium may occasionally be stored in the storage medium, and information (including icon information for discriminatively displaying a program, etc.) depending on an OS or the like on the program reading side may occasionally be stored in the storage medium.

Moreover, the data depending on the various programs are administrated by a directory. Besides, programs or the like to uncompress installed programs and data are occasionally stored when the installed programs and data have been compressed.

Furthermore, the functions of the embodiments shown in FIGS. 4, 9, 10, 16, 21, 24, 26 and 30 may be executed by a host computer based on externally installed programs. In this case, the present invention is applicable even in a case where an information group including programs is supplied from a storage medium (such as a CD-ROM, a flash memory, or an FD) or an external storage medium through a network to an output apparatus.

Incidentally, it is needless to say that the object of the present invention can be achieved in a case where the storage medium storing the program codes of software to realize the functions of the above embodiments is supplied to a system or an apparatus and then a computer (or CPU or MPU) in the system or the apparatus reads and executes the program codes stored in the storage medium.

In this case, the program codes themselves read from the storage medium realize the new functions of the present invention, whereby the storage medium storing these program codes constitutes the present invention.

As the storage medium for supplying the program codes, e.g., a flexible disk, a hard disk, an optical disk, a magnetooptical disk, a CR-ROM, a CD-R, a magnetic tape, a nonvolatile memory card, a ROM, an EEPROM or the like can be used.

Moreover, it is needless to say that the present invention includes not only a case where the functions of the above embodiments are realized by executing the program codes read by the computer, but also a case where an OS (operating system) or the like functioning on the computer executes a part or all of the actual process according to instructions of the program codes, whereby the functions of the above embodiments are achieved by that process.

Furthermore, it is needless to say that the functions of the above embodiments can be achieved in a case where the program read from the storage medium is once written in a memory provided in a function expansion board inserted in the computer or a function expansion unit connected to the computer, and then a CPU or the like provided in the function expansion board or the function expansion unit executes a part or all of the actual process according to the instructions of the program.

The present invention is not limited to the above embodiments. That is, various modifications (including an organic combination of the respective embodiments) can be achieved on the basis of the purposes of the present invention, and these modifications are not excluded from the scope of the present invention.

As many apparently widely different embodiments of the present invention can be made without departing from the spirit and scope thereof, it is to be understood that the present invention is not limited to the specific embodiments thereof expect as defined in the appended claims.

The invention claimed is:

1. A data processing method for an image processing system that includes a server apparatus, a print apparatus and a data processing apparatus, said method comprising:
   a first extraction step of extracting, based on first image data, first feature information indicating a feature of the first image data;
   a first transmission step of transmitting, from the data processing apparatus to the server apparatus, the extracted first feature information;
   a registering step of registering, at the server apparatus, the transmitted first feature information;
   a detecting step of detecting, at the data processing apparatus, identification information indicating the registered first feature information;
   a second extraction step of extracting, based on second image data, second feature information indicating a feature of the second image data;
   a third extraction step of extracting, based on third image data, third feature information indicating a feature of the third image data;
   a second transmission step of transmitting, from the data processing apparatus to the server apparatus, the detected identification information, the extracted second feature information, and the extracted third feature information;
   a confirming step of confirming, at the server apparatus, the transmitted second feature information based on the previously registered first feature information that is specified by the transmitted identification information;
   a first notification step of notifying the data processing apparatus of a confirmation result; and
   a print step of printing, at the print apparatus, information in accordance with the notified confirmation result,
   wherein the registered first feature information is replaced by the transmitted third feature information in a case where the transmitted second feature information is confirmed successfully.

2. A data processing method according to claim 1, further comprising a second notification step of notifying, when the transmitted first feature information is registered, the data processing apparatus of the identification information indicating the registered first feature information.

3. A data processing method according to claim 2, further comprising:
   a generating step of generating, at the data processing apparatus, print data based on the first image data and the notified identification information; and
   a control step of causing the print apparatus to print the generated print data.

4. A data processing method according to claim 1, wherein the notified confirmation result indicates whether or not the second image data is confirmed as a newest original.

5. A data processing method according to claim 1, wherein the notified confirmation result indicates whether or not the second image data is confirmed as a registered original.

* * * * *